United States Patent
Helline

(10) Patent No.: US 12,247,640 B2
(45) Date of Patent: Mar. 11, 2025

(54) METHOD AND APPARATUS FOR UTILIZING A REPAIRABLE CHAIN BINDER

(71) Applicant: Kellysrt, LLC, Canal Fulton, OH (US)

(72) Inventor: Steven M. Helline, Canal Fulton, OH (US)

(73) Assignee: KELLYSRT, LLC, Canal Fulton, OH (US)

( * ) Notice: Subject to any disclaimer, the term of this patent is extended or adjusted under 35 U.S.C. 154(b) by 274 days.

(21) Appl. No.: 17/971,263

(22) Filed: Oct. 21, 2022

(65) Prior Publication Data

US 2024/0133447 A1    Apr. 25, 2024
US 2024/0229897 A9    Jul. 11, 2024

(51) Int. Cl.
*F16G 11/12*    (2006.01)
*B25B 25/00*    (2006.01)

(52) U.S. Cl.
CPC ............. *F16G 11/12* (2013.01); *B25B 25/00* (2013.01)

(58) Field of Classification Search
CPC ...... F16G 11/12; F16H 57/04; F16H 57/0464; F16H 57/0495; B60P 7/083; B25B 25/00; Y10T 24/2175; Y10T 24/2177; Y10T 24/2119
See application file for complete search history.

(56) References Cited

U.S. PATENT DOCUMENTS

| | | |
|---|---|---|
| 675,550 A | 6/1901 | Meyerhoff |
| 2,248,902 A | 7/1941 | Cloutier |
| 3,065,007 A | 11/1962 | Colmer, Jr. |
| 3,338,359 A | 8/1967 | Baillie et al. |
| 3,848,889 A | 11/1974 | Sharrow |
| 4,223,869 A | 9/1980 | Patterson, III et al. |
| 4,239,188 A | 12/1980 | Hobbs |
| 4,413,807 A | 11/1983 | Winter |
| 4,826,644 A | 5/1989 | Lindquist et al. |
| 4,830,339 A | 5/1989 | McGee et al. |
| 4,884,928 A | 12/1989 | Nachtigall et al. |
| 4,934,122 A | 6/1990 | Linquist |

(Continued)

OTHER PUBLICATIONS

Vulcan Load Binder, Model LBR10-HD, TrucknTow.com website—https://www.truckntow.com/vulcan-load-binder-with-2-grab-hooks-4-pack-ratchet-style-7-100-pound-safe-working-load-works-with-5-16-inch-or-3-8-inch-grade-70-chain-1.html?utm_source=nextopia_search ; document is undated but is believed to have been available to the public prior to Oct. 21, 2022.

*Primary Examiner* — Jason W San
*Assistant Examiner* — Louis A Mercado
(74) *Attorney, Agent, or Firm* — Sand, Sebolt & Wernow Co., LPA

(57) ABSTRACT

A chain binder to connect and apply tension to chains, straps, or the like used to secure cargo on any type of platform or vehicle. The chain binder includes a lever body; a first side portion; a second side portion; and gears that effectuate two modes of operation. Namely, a power driven mode of operation or a manual lever mode of operation. Rotations of the gears causes hooks or connectors, via movement of eye-bolts, toward each other to place tension in the chains or strap. Opposite rotations of the gears causes hooks or connectors, via movement of eye-bolts, away from each other to relax the chains or strap. If components are damages during use, they may be replaced on an as-needed basis to reduce operational cost of the chain binder since the entire binder does not need replaced when only one component fails or is damaged.

18 Claims, 20 Drawing Sheets

(56) References Cited

U.S. PATENT DOCUMENTS

| | | | |
|---|---|---|---|
| 4,963,082 A | 10/1990 | Lindquist et al. | |
| 4,993,687 A | 2/1991 | Crook et al. | |
| 5,070,582 A | 12/1991 | Anderson | |
| 5,174,079 A | 12/1992 | Bambacigno et al. | |
| 5,234,191 A | 8/1993 | Bambacigno et al. | |
| 5,360,163 A | 11/1994 | Dupre | |
| 5,372,772 A | 12/1994 | Bambacigno et al. | |
| 5,611,521 A | 3/1997 | Grover et al. | |
| 5,911,409 A | 6/1999 | Grover | |
| 6,048,146 A | 4/2000 | Wiedmeyer | |
| 6,176,145 B1 | 1/2001 | Jackson | |
| 6,318,947 B1 | 11/2001 | Hahn et al. | |
| 7,055,804 B2 | 6/2006 | Scott | |
| 7,229,065 B2 | 6/2007 | Scott et al. | |
| 7,389,971 B2 | 6/2008 | Gaudreault et al. | |
| 7,552,913 B1 | 6/2009 | Amoss et al. | |
| 7,774,950 B2 | 8/2010 | Lasley | |
| 8,152,139 B2 | 4/2012 | Wang | |
| 8,166,831 B2 | 5/2012 | Ruan | |
| 8,672,594 B1 | 3/2014 | West | |
| 8,794,380 B2 | 8/2014 | Glenn, Jr. et al. | |
| 9,453,557 B2 | 9/2016 | Chou | |
| 9,510,523 B2 | 12/2016 | Santucci | |
| 9,561,838 B1 | 2/2017 | Byers | |
| 9,790,656 B1 | 10/2017 | Mcknight | |
| 10,308,163 B2 * | 6/2019 | Helline | B60P 7/0853 |
| 10,384,591 B2 * | 8/2019 | Chao | B60P 7/083 |
| 10,752,156 B2 * | 8/2020 | Ruan | B60P 7/083 |
| 11,440,458 B2 * | 9/2022 | Mollick | F16G 11/12 |
| 11,691,559 B2 * | 7/2023 | Helline | B60S 9/08 |
| | | | 280/766.1 |
| 12,031,609 B1 * | 7/2024 | Wells, Jr. | F16G 11/12 |
| 2004/0096305 A1 | 5/2004 | Shubert | |
| 2008/0118324 A1 * | 5/2008 | Fritel | F16G 11/12 |
| | | | 410/100 |
| 2009/0162162 A1 | 6/2009 | Manesis | |
| 2010/0126246 A1 | 5/2010 | Smith | |
| 2014/0054523 A1 | 2/2014 | Williams | |
| 2014/0109361 A1 | 4/2014 | Helline | |
| 2017/0238455 A1 | 8/2017 | Marwitz | |
| 2017/0355298 A1 | 12/2017 | Cahall | |
| 2018/0251063 A1 | 9/2018 | Helline et al. | |
| 2019/0186595 A1 * | 6/2019 | Agarwalla | F16G 3/006 |
| 2019/0351809 A1 * | 11/2019 | Liu | B60P 7/0823 |
| 2020/0164786 A1 | 5/2020 | Ruan et al. | |
| 2021/0122287 A1 | 4/2021 | Mollick | |
| 2022/0144080 A1 | 5/2022 | Burckhard et al. | |
| 2022/0242302 A1 | 8/2022 | Goetz | |
| 2022/0250425 A1 | 8/2022 | Brown | |
| 2022/0389988 A1 * | 12/2022 | Mollick | F16H 31/005 |
| 2023/0114302 A1 * | 4/2023 | Kreidler | B60P 7/083 |
| | | | 410/103 |
| 2023/0287962 A1 * | 9/2023 | Dolezych | F16G 11/12 |
| 2024/0001837 A1 * | 1/2024 | Mollick | F16G 11/12 |

\* cited by examiner

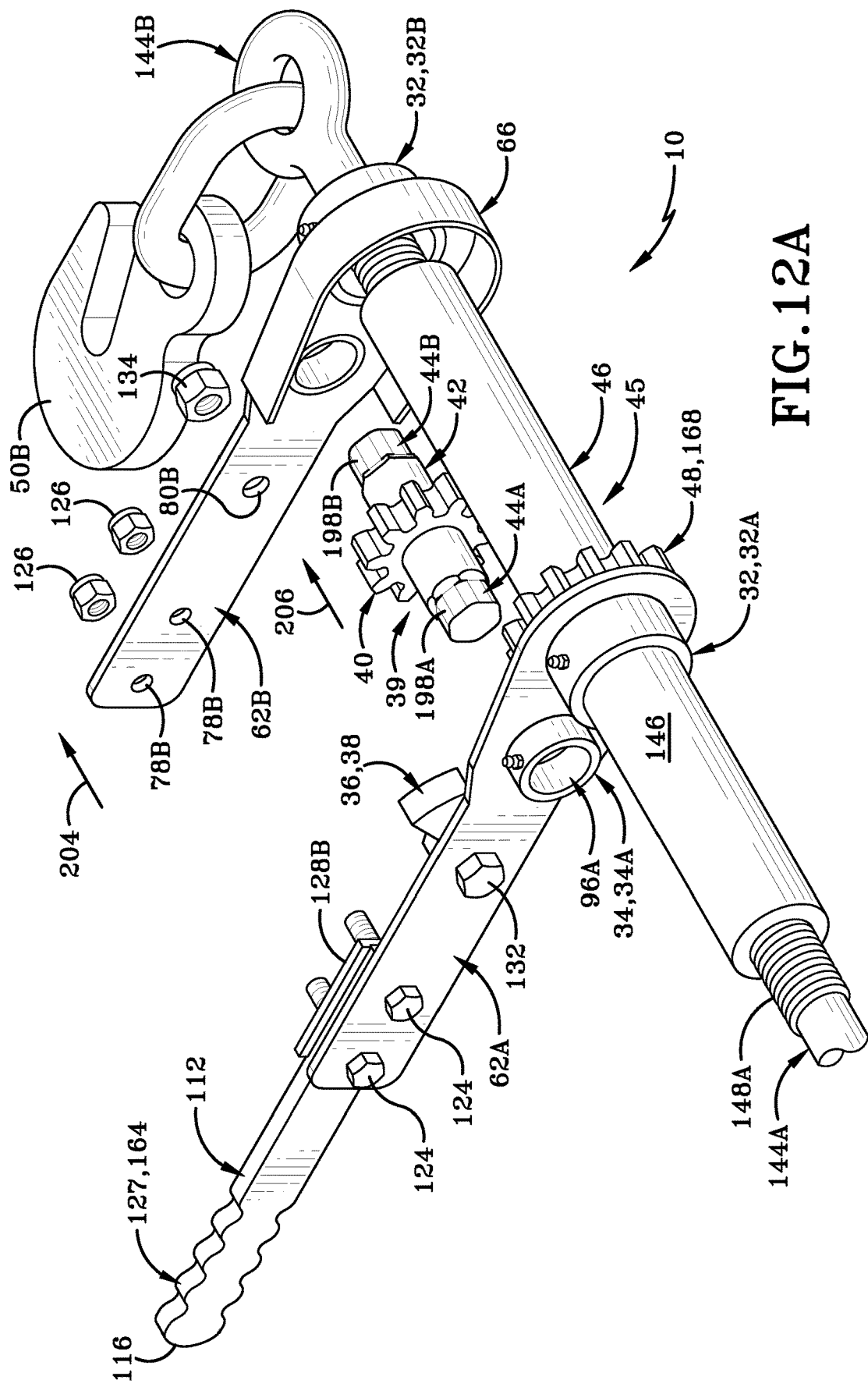

METHOD AND APPARATUS FOR UTILIZING A REPAIRABLE CHAIN BINDER

TECHNICAL FIELD

This disclosure is directed to chain binders. The disclosure relates generally to a chain binder having two modes of action and the ability to repair the chain binder in the event of failure.

BACKGROUND

There are a variety of chain binders on the market that may be used to secure different types of loads on vehicles. The loads may be any type of object for example, chain binders are used to secure freight to a platform on a truck. However, chain binders can also be used for securing chains between two floating ships together. The possibilities for the use of chain binders are effectively endless when considering the number of loads that can be secured together through the use of a chain or strap.

For example, ratchet chain binders or lever chain binders are known for this purpose. However, conventional ratchet or lever chain binders for tightening chains or straps that hold down freight or hold together objects are fabricated in a heavy duty manner and are often very expensive due to their significant fabrication and construction. Even with their heavy-duty construction, chain binders are not without fault. Like other heavy duty devices, they still may fail or be damaged when subjected to excessive loads. However, if one component fails, it may not necessarily damage other components on the chain binder. However, due to their heavy-duty construction the damaged components cannot be repaired and the entire chain binder must be discarded and replaced. This is clearly extremely costly.

SUMMARY

What is needed is a chain binder that can have portions or components of the chain binder that can be sacrificed in the event they become damaged. What is also needed is a chain binder that is able to be disassembled so a damaged component can be replaced and the chain binder be reassembled so the other non-damaged may be reused. This will greatly reduce the operational costs as it should reduce the need to entirely replace the chain binder in the event only one component is damaged. The present disclosure addresses these needs and other issues by providing a chain binder that has components that can be sacrificed in the event they become damaged. Another embodiment of the present disclosure addresses these needs and other issues by providing a chain binder that enables a damaged component to be replaced without having to replace the entire chain binder.

In one aspect, an exemplary embodiment of the present disclosure may provide a chain binder comprising: a first end opposite a second end defining a longitudinal direction therebetween, and a first side opposite a second side defining a transverse direction therebetween, wherein the longitudinal direction is perpendicular to the transverse direction; a lever body having a length that extends in the longitudinal direction; wherein the lever body defines an interior space; and the lever body moves about an axis that is aligned in the transverse direction, and the lever body including a first boss extending outward in the transverse direction from one side of the lever body and a second boss extending outward in the transverse direction from another side of the lever body; a ratchet mechanism comprising a pawl coupled to at least one gear adjacent or within the interior space of the lever body; a drive axle coupled to the at least one gear, wherein the drive axle includes a first drive head adapted to driven by a device; wherein the at least one gear is configured to move in two different modes of operation, wherein a first mode of operation moves the at least one gear by the drive axle being driven by the device and a second mode of operation moves the at least one gear in response to the ratchet mechanism moving in response to movement of the lever body; a tubular member extending along the axis, and the tubular member having a second gear fixedly attached to the tubular member, wherein the second gear is in rotational communication with the at least one gear, wherein a portion of the tubular member extends in the transverse direction through the first boss, the interior space, and the second boss; and a first hook or connector adjacent the first side and a second hook or connector adjacent the second side, wherein movement of the at least one gear is configured to move the first and second hooks or connectors relative to each other to tension or relax an element to which the chain binder is attached.

In another aspect, an exemplary embodiment of the present disclosure may provide a chain binder comprising: a first end opposite a second end defining a longitudinal direction therebetween, and a first side opposite a second side defining a transverse direction therebetween, wherein the longitudinal direction is perpendicular to the transverse direction; a lever body having a length that extends in the longitudinal direction, wherein the lever body defines an interior space, and the lever body rotates about an axis that is aligned in the transverse direction, and the lever body including a first boss extending outward in the transverse direction from one side of the lever body and a second boss extending outward in the transverse direction from another side of the lever body; a drive axle assembly including a drive axle coupled to at least one gear; a tubular member extending along the axis, and the tubular member having a second gear fixedly attached to the tubular member, wherein the second gear is in rotational communication with the at least one gear, wherein a portion of the tubular member extends in the transverse direction through the first boss, the interior space, and the second boss; and a first connector adjacent the first side and a second connector adjacent the second side, wherein movement of the at least one gear is configured to move the first and second connectors relative to each other to tension or relax an element to which the chain binder is attached. This exemplary embodiment or another exemplary embodiment may further provide that the first boss defines an outer race for the tubular member. This exemplary embodiment or another exemplary embodiment may further provide a third boss on the lever body that extends from the lever body in the transverse direction toward the first side, wherein the drive axle extends through the third boss. This exemplary embodiment or another exemplary embodiment may further provide a width of the first boss, wherein the of the first boss is measured in the transverse direction; and a width of the third boss, wherein the of the third boss is measured in the transverse direction; wherein the width of the first boss is greater than the width of the third boss. This exemplary embodiment or another exemplary embodiment may further provide a ratio of the width of the first boss to the width of the third boss, wherein the ratio is about 1.5:1. This exemplary embodiment or another exemplary embodiment may further provide a grease fitting on the third boss, wherein the grease fitting is in operative communication with the interior space of the lever body. This exemplary embodiment or another exemplary embodiment may further provide a fourth boss on the lever body that extends from the lever body in the transverse direction toward the second side, wherein the drive axle extends through the fourth boss. This exemplary embodiment or another exemplary embodiment may further provide a grease fitting on the fourth boss, wherein the grease fitting is in operative communication with the interior space of the lever body. This exemplary embodiment or another exemplary embodiment may further provide that the first boss and the second boss define a first pair of bosses having a first diameter; and a second pair of bosses composed of a third boss and a fourth boss each having a second diameter, wherein the second diameter is smaller than the first diameter, and wherein the second pair of bosses extend outward from respective sides of the lever body, and wherein the drive axle extends through the second pair of bosses. This exemplary embodiment or another exemplary embodiment may further provide an inner surface of the first boss; an exterior surface of the tubular member; wherein the inner surface of the first boss are in positioned within a range from directing contacting each other to a ½ inch separation from each other. This exemplary embodiment or another exemplary embodiment may further provide a ratchet mechanism comprising a pawl coupled to the at least one gear adjacent or within the interior space of the lever body; and wherein the at least one gear is configured to move in two different modes of operation, wherein a first mode of operation moves the at least one gear by the drive axle being driven by the device and a second mode of operation moves the at least one gear in response to the ratchet mechanism moving in response to movement of the lever body.

In yet another aspect, another exemplary embodiment of the present disclosure may provide a method for a chain binder comprising: coupling a device to a first drive head positioned with a lever body of a chain binder, wherein the first drive head is on a drive axle and the drive axle is coupled to at least one gear; rotating the drive head with the device to rotate the at least one gear; rotating a second gear in operative communication with the at least one gear in response to rotation of the at least one gear, wherein the second gear is connected to a tubular member, wherein a portion of the tubular member extends in a transverse direction through a first boss extending outward towards a first side of the chain binder from the lever body, through an interior space of the lever body, and through a second boss extending outward towards a second side of the chain binder from the lever body; rotating the tubular member about an axis within the first boss and within the second boss in response to rotation of the second gear; and translating a first connector coupled to the tubular member relative to a second connector coupled to the tubular member in response to rotation of the tubular member, wherein translation of the first connector in a first direction places tension in an element to which the chain binder is coupled and translation of the first connector in an opposite second direction relaxes the element to which the chain binder is coupled. This exemplary embodiment or another exemplary embodiment may further provide rotating an exterior surface of the tubular member about the axis adjacent an inner surface of the first boss, wherein the inner surface of the first boss are in positioned within a range from directing contacting each other to a ½ inch separation from each other. This exemplary embodiment or another exemplary embodiment may further provide applying a lubricant to the exterior surface of the tubular member via a first grease fitting on the first boss. This exemplary embodiment or another exemplary embodiment may further provide applying the lubricant to at least one gear or the second gear via the first grease fitting on the first boss, wherein the first grease fitting is in operative fluid communication with the interior space of the lever body within which the at least one gear and the second gear are disposed. This exemplary embodiment or another exemplary embodiment may further provide applying the lubricant to the exterior surface of the tubular member via a second grease fitting on the second boss. This exemplary embodiment or another exemplary embodiment may further provide applying the lubricant to at least one gear or the second gear via the second grease fitting on the second boss, wherein the second grease fitting is in operative fluid communication with the interior space of the lever body within which the at least one gear and the second gear are disposed. This exemplary embodiment or another exemplary embodiment may further provide rotating the tubular member via a ratchet mechanism comprising a pawl coupled to the at least one gear adjacent or within the interior space of the lever body; and wherein the at least one gear is configured to move in two different modes of operation, wherein a first mode of operation moves the at least one gear by the drive axle being driven by the device and a second mode of operation moves the at least one gear in response to the ratchet mechanism moving in response to movement of the lever body.

In yet another aspect, another exemplary embodiment of the present disclosure may provide a chain binder comprising: a first end opposite a second end defining a longitudinal direction therebetween, and a first side opposite a second side defining a transverse direction therebetween, wherein the longitudinal direction is perpendicular to the transverse direction; a drive axle assembly including a drive axle coupled to at least one gear; a first drive head on the drive axle that is adapted to driven by a device, and the first drive head having a first portion and a second portion; an end of the first drive head on the first portion, wherein the first portion is adapted to be sacrificially used to drive the at least one gear and if the first portion becomes damaged, then the first portion is sacrificed and severed to leave the second portion connected to the at least one gear and then the second portion is adapted to be used by the device to drive the at least one gear after the first portion was sacrificed, severed and discarded; a tubular member extending along the axis, and the tubular member having a second gear fixedly attached to the tubular member, wherein the second gear is in rotational communication with the at least one gear, wherein a portion of the tubular member extends in the transverse direction; and a first connector adjacent the first side and a second connector adjacent the second side, wherein movement of the at least one gear is configured to move the first and second connectors relative to each other to tension or relax an element to which the chain binder is attached. This exemplary embodiment or another exemplary embodiment may further provide a first indicator on the first drive head located between the end and the at least one gear, wherein the first indicator divides the first drive head into the first portion and the second portion and provides an indication as to where to sever the first portion from the second portion; wherein the first portion is sacrificially used to drive the at least one gear and if the first portion becomes damaged, then the first portion may be sacrificed and severed at the first indicator to leave the second portion connected to the at least one gear and the second portion is then used by the device to drive the at least one gear after the first portion was sacrificed, severed and discarded. This exemplary embodiment or another exemplary embodiment may further provide that the first indicator is a notch in an outer surface of the first drive head. This exemplary embodiment or another exemplary embodiment may further provide that the first indicator is located at a location that divides the first portion and the second portion equally. This exemplary embodiment or another exemplary embodiment may further provide that the drive axle has a hexagonal configuration and the first indicator is located at an edge of the hexagonal configuration. This exemplary embodiment or another exemplary embodiment may further provide that the first indicator is one of six indicators on the drive axle. This exemplary embodiment or another exemplary embodiment may further provide a second drive head, wherein the first drive head extends outward towards the first side from the at least one gear and the second drive head extends outwards towards the second side from the at least one gear, wherein the drive axle defines a drive axle that is aligned in the transverse direction. This exemplary embodiment or another exemplary embodiment may further provide an end of the second drive head; a second indicator on the second drive head located between the end of the second drive head and the at least one gear, wherein the second indicator divides the second drive head into a first portion and a second portion, wherein the end of the second drive head is on the first portion, and wherein the first portion of the second drive head is sacrificially used to drive the at least one gear and if the second portion of the second drive head becomes damaged, then the first portion of the second drive head may be sacrificed and severed at the second indicator to leave the second portion of the second drive head connected to the at least one gear and the second portion of the second drive head is then used by the device to drive the at least one gear after the first portion of the second drive head was sacrificed, severed and discarded. This exemplary embodiment or another exemplary embodiment may further provide the second drive head having a first portion and second portion, wherein the first drive head extends transversely outward towards the first side from the at least one gear and the second drive head extends transversely outwards towards the second side from the at least one gear, wherein the drive axle defines a drive axle that is aligned in the transverse direction. This exemplary embodiment or another exemplary embodiment may further provide an end of the second drive head on the first portion thereof, wherein the first portion of the second drive head is adapted to be sacrificially used to drive the at least one gear and if the first portion of the second drive head becomes damaged, then the first portion thereof is sacrificed and severed to leave the second portion connected to the at least one gear and then the second portion of the second drive head is adapted to be used by the device to drive the at least one gear after the first portion was sacrificed, severed and discarded. This exemplary embodiment or another exemplary embodiment may further provide a second indicator on the second drive head located between the end of the second drive head and the at least one gear, wherein the second indicator divides the second drive head into the first portion and the second portion and provides an indication as to where to sever the first portion from the second portion on the second drive head. This exemplary embodiment or another exemplary embodiment may further provide a lever body having a length that extends in the longitudinal direction, wherein the lever body defines an interior space, and the lever body rotates about an axis that is aligned in the transverse direction; a ratchet mechanism comprising a pawl coupled to the at least one gear adjacent or within the interior space of the lever body; and wherein the at least one gear is configured to move in two different modes of operation, wherein a first mode of operation moves the at least one gear by the drive axle being driven by the device and a second mode of operation moves the at least one gear in response to the ratchet mechanism moving in response to movement of the lever body.

In yet another aspect, another exemplary embodiment of the present disclosure may provide a method for a chain binder comprising: (i) coupling a device to a first portion of a first drive head extending from a first side of a chain binder, wherein the first drive head is part of a drive axle and the drive axle is coupled to at least one gear; (ii) rotating the first drive head with the device to rotate the at least one gear; (iii) rotating a second gear in operative communication with the at least one gear in response to rotation of the at least one gear, wherein the second gear is connected to a tubular member; (iv) rotating the tubular member about an axis in response to rotation of the second gear; (v) translating a first connector coupled to the tubular member relative to a second connector coupled to the tubular member in response to rotation of the tubular member, wherein translation of the first connector in a first direction places tension in an element to which the chain binder is coupled and translation of the first connector in an opposite second direction relaxes the element to which the chain binder is coupled; (vi) determining whether the first portion of the first drive head has been damaged; if determined that the first portion of first drive head has not been damaged, then repeating steps (i)-(vi); and if determined that the first portion of the first drive head has been damaged, then severing the first portion of the first drive head and revealing a second portion of the first drive head, and repeating steps (ii)-(v) with the device coupled to the second portion of the first drive head. This exemplary embodiment or another exemplary embodiment may further provide that if it is determined that the first portion of the first drive head has been damaged, then severing the first portion of the first drive head at an indicator on the first drive head, wherein the indicator delineates between the first portion and the second portion of the first drive head. This exemplary embodiment or another exemplary embodiment may further provide (vii) determining whether the second portion of the first drive head has been damaged; if determined that the second portion of first drive head has not been damaged, then repeating steps (ii)-(v) with the device coupled to the second portion of the first drive head; and if determined that the second portion of the first drive head has been damaged, then coupling the device to a first portion of a second drive head extending from a second side of the chain binder, wherein the second drive head is part of the drive axle and repeating steps (ii)-(v) with the device coupled to the first portion of the second drive head. This exemplary embodiment or another exemplary embodiment may further provide that if it is determined that the second portion of the first drive head has been damaged and coupling the device to the first portion of the second drive head further comprises: (viii) determining whether the first portion of the second drive head has been damaged; if determined that the first portion of second drive head has not been damaged, then repeating steps (ii)-(v) with the device coupled to the first portion of the second drive head; and if determined that the first portion of the second drive head has been damaged, then severing the first portion of the second drive head and revealing a second portion of the second drive head, and repeating steps (ii)-(v) with the device coupled to the second portion of the second drive head. This exemplary embodiment or another exemplary embodiment may further provide that if it is determined that the first portion of the second drive head has been damaged, then severing the first portion of the second drive head at a second indicator on the second drive head, wherein the second indicator delineates between the first portion and the second portion of the second drive head. This exemplary embodiment or another exemplary embodiment may further provide that revealing a second portion of the first drive head provides the second portion of the first drive head with an outer peripheral configuration that is the same as the first portion of the first drive head prior to the first point being damaged.

In yet another aspect, another exemplary embodiment of the present disclosure may provide a chain binder comprising: a first end opposite a second end defining a longitudinal direction therebetween, and a first side opposite a second side defining a transverse direction therebetween, wherein the longitudinal direction is perpendicular to the transverse direction; a lever body having a length that extends in the longitudinal direction, wherein the lever body defines an interior space, and the lever body rotates about an axis that is aligned in the transverse direction, and the lever body includes a first portion defining a first side of the lever body and a second portion defining a second portion of the lever body; a ratchet mechanism comprising a pawl adjacent or within the interior space of the lever body; a tubular member extending along the axis, and the tubular member having a gear fixedly attached to the tubular member, wherein the gear is in direct or indirect rotational communication with the ratchet mechanism, wherein a portion of the tubular member extends in the transverse direction through the interior space; and a first connector adjacent the first side and a second connector adjacent the second side, wherein movement of gear imparts movement to the first and second connectors relative to each other to tension or relax an element to which the chain binder is attached; wherein the first portion of the lever body and the second portion of the lever body are configured to be separated in the event one of the gear and the tubular member is damaged, wherein separation of the first portion and the second portion is adapted to enable the one of the gear and the tubular member that is damaged to be removed and replaced. This exemplary embodiment or another exemplary embodiment may further provide a weld that connects the first portion to the second portion of the lever body, wherein the weld is adapted to be ground or severed in the event the first portion is to be separated from the second portion. This exemplary embodiment or another exemplary embodiment may further provide a bolt that connects the first portion to the second portion of the lever body, wherein the bolt is adapted to be unscrewed in the event the first portion is to be separated from the second portion. This exemplary embodiment or another exemplary embodiment may further provide that the bolt is one of four bolts that connected the first portion to the second portion. This exemplary embodiment or another exemplary embodiment may further provide that the four bolts are spaced equally around the axis about which the tubular member extends. This exemplary embodiment or another exemplary embodiment may further provide a channel formed within an inner surface of one of the first portion of the lever body and the second portion of the lever body. This exemplary embodiment or another exemplary embodiment may further provide a wall disposed within the channel, wherein the wall extends transversely between the first portion of the lever body and the second portion of the lever body. This exemplary embodiment or another exemplary embodiment may further provide a wall that extends transversely between the first portion of the lever body and the second portion of the lever body. This exemplary embodiment or another exemplary embodiment may further provide a drive axle assembly including a drive axle coupled to at least one drive gear, wherein the at least one drive gear is disposed within the interior space of the lever body; wherein the at least one drive gear is in rotational communication with the ratchet mechanism and the gear on the tubular member. This exemplary embodiment or another exemplary embodiment may further provide that the first portion of the lever body and the second portion of the lever body are configured to be separated in the event one of the drive axle and the at least one drive gear is damaged, wherein separation of the first portion and the second portion is adapted to enable the one of the drive axle and the at least one drive gear that is damaged to be removed and replaced.

In yet another aspect, another exemplary embodiment of the present disclosure may provide a method for a chain binder comprising: (i) rotating a gear positioned between a first portion and a second portion of a lever body of a chain binder; (ii) rotating a tubular member about an axis in response to rotation of the second gear; (iii) translating a first connector coupled to the tubular member relative to a second connector coupled to the tubular member in response to rotation of the tubular member, wherein translation of the first connector in a first direction places tension in an element to which the chain binder is coupled and translation of the first connector in an opposite second direction relaxes the element to which the chain binder is coupled; (iv) determining that one of the gear has been damaged; (v) separating the first portion from the second portion of the lever body of the chain binder; (vi) removing the gear that was determined to be damaged and replacing the damaged gear with a new gear; and (vii) reconnecting first portion and the second portion of the lever body and repeating steps (i)-(iii) with the chain binder having the new gear. This exemplary embodiment or another exemplary embodiment may further provide that (v) separating the first portion from the second portion of the lever body of the chain binder is accomplished by detaching a wall from one of the first portion and the second portion of the lever body, wherein the wall bounds a portion of an interior space, and the gear is disposed within the interior space. This exemplary embodiment or another exemplary embodiment may further provide that detaching the wall is accomplished by grinding a weld that connects the wall to one of the first portion and the second portion of the lever body. This exemplary embodiment or another exemplary embodiment may further provide that detaching the wall is accomplished by unscrewing a bolt and nut that connect the first portion and the second portion of the lever body. This exemplary embodiment or another exemplary embodiment may further provide that detaching the wall is accomplished by unscrewing four bolts and nuts that connect the first portion and the second portion of the lever body, wherein the four bolts and nuts are spaced equally about the axis about which the tubular member rotates. This exemplary embodiment or another exemplary embodiment may further provide that reconnecting first portion and the second portion of the lever body is accomplished by inserting the wall into a channel formed in one of the first portion and the second portion of the lever body.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 12A is an operational top perspective view of a portion of the lever body being opened or disassembled.

Similar numbers refer to similar parts throughout the drawings.

DETAILED DESCRIPTION

Figure 1:
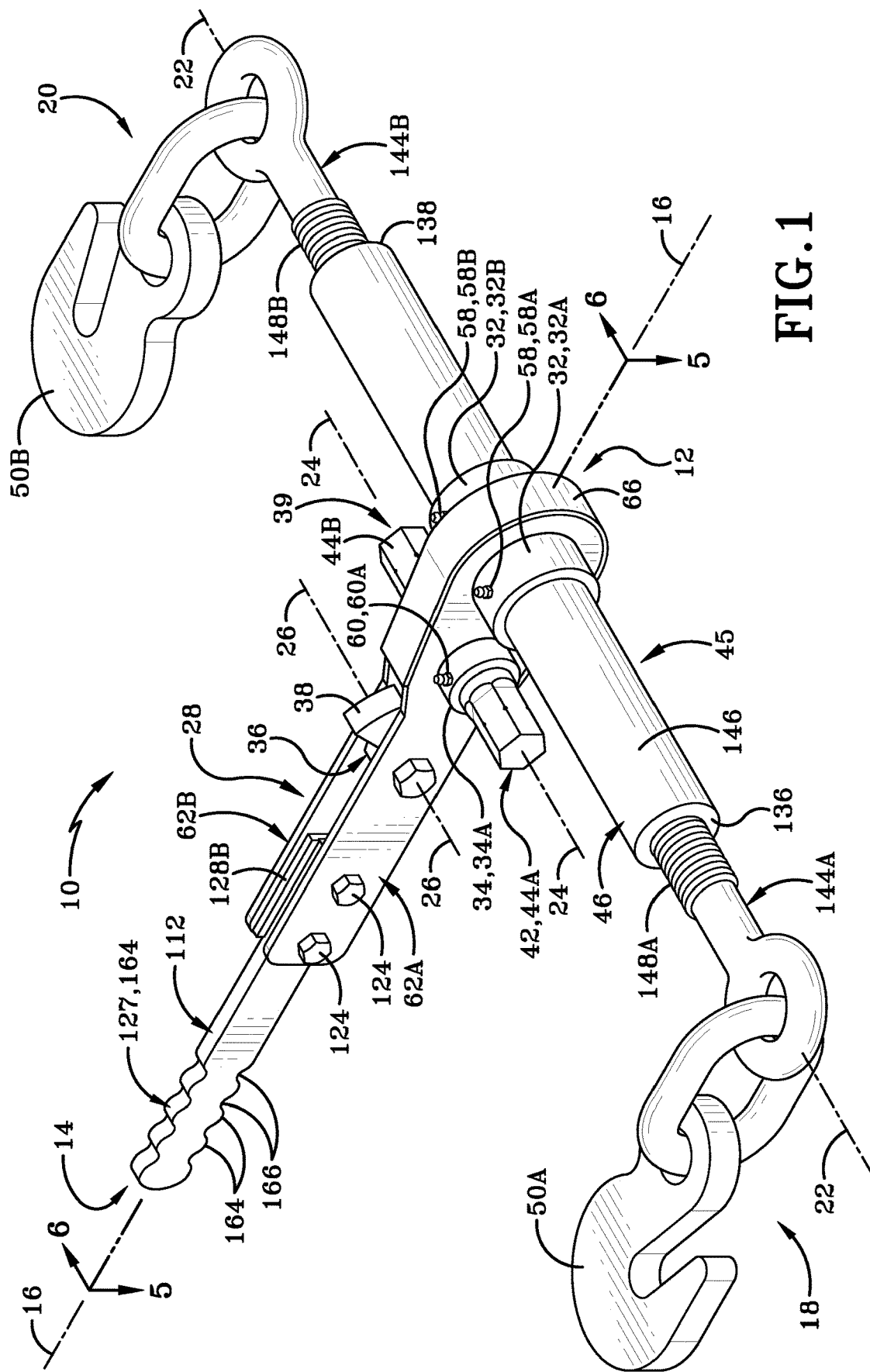
FIG. 1 is top perspective view of a chain binder of the present disclosure.

A chain binder is depicted throughout the figures generally at 10. Chain binder 10 includes a first end opposite a second end 14 defining a longitudinal direction therebetween. A first axis 16 extends centrally in the longitudinal direction. Chain binder 10 includes a first side 18 opposite a second side 20 defining a transverse direction therebetween. The longitudinal direction is perpendicular to the transverse direction. Chain binder 10 includes a transverse second axis 22, a transverse third axis 24, and a transverse fourth axis 26. Various components rotate about or more relative to the transverse second axis 22, the transverse third axis 24, and the transverse fourth axis 26 as described herein.

Figure 2:
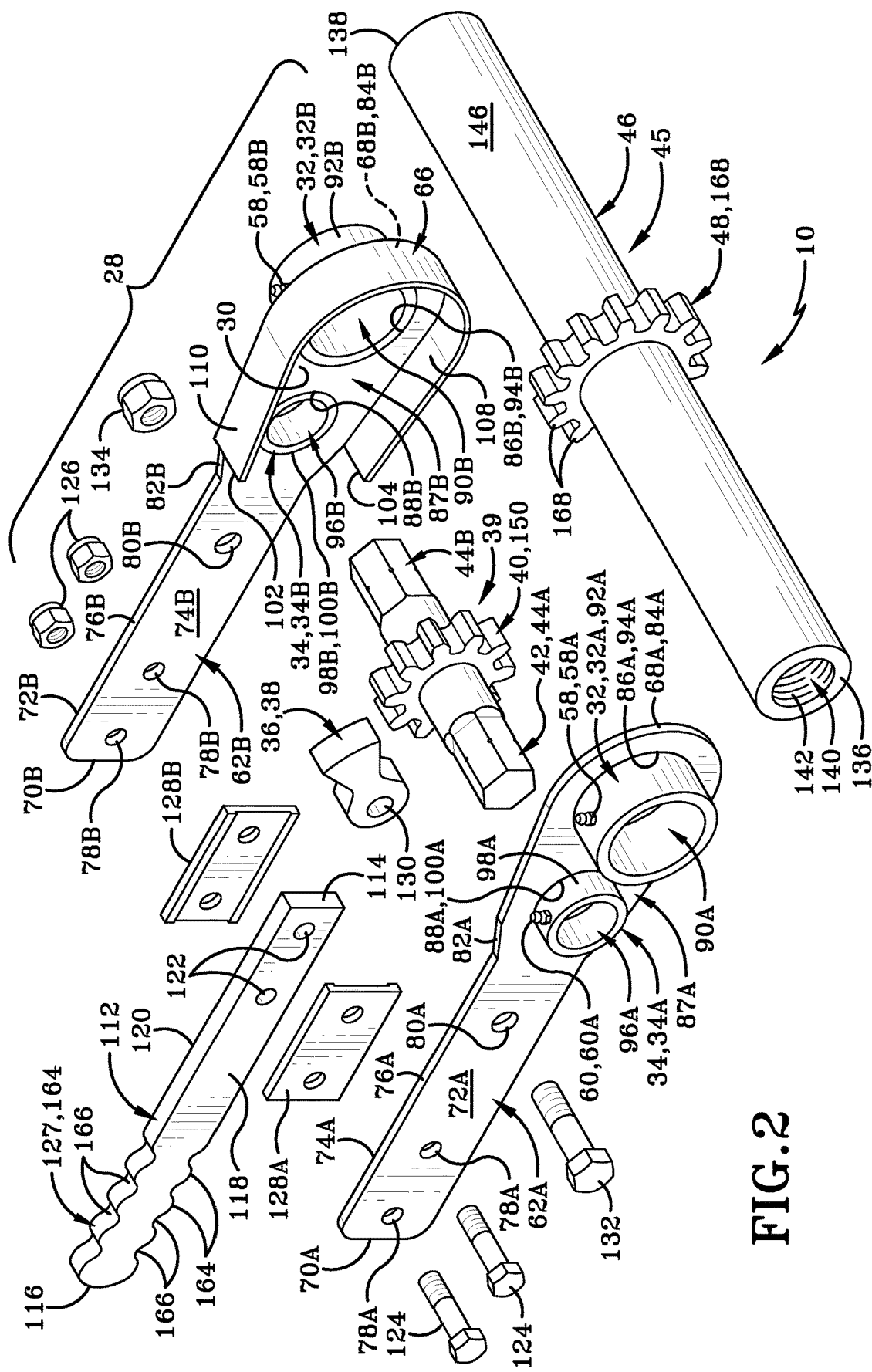
FIG. 2 is a an exploded perspective view of the lever body and tubular member of the chain binder according to one exemplary embodiment of the present disclosure.

Chain binder 10 includes a lever body 28, generally, that has a length that extends in the longitudinal direction. The length of the lever body is centered on first axis 16 and extends generally fully from first end 12 to second end 14. The lever body 28 defines an interior space 30 (FIG. 2). As detailed herein, the lever body 28 moves about the transverse second axis 22. The lever body includes a first pair of bosses 32 that is composed of a first boss 32A extending outward in the transverse direction from one side of the lever body 28 and a second boss 32B extending outward in the transverse direction from another side of the lever body 28. The lever body includes a second pair of bosses 34 that is composed of a third boss 34A extending outward in the transverse direction from one side of the lever body 28 and a fourth boss 34B extending outward in the transverse direction from another side of the lever body 28. Each of the bosses is shaped or configured as a rigid tube or collar.

Chain binder 10 includes a ratchet mechanism 36 comprising a pawl 38 coupled to a drive assembly 39. Drive assembly 39 comprises at least one gear 40 within the interior space 30 of the lever body 28. Additionally, the drive assembly 39 has a drive axle 42 fixedly connected to the at least one gear 40, wherein the drive axle 42 includes a first drive head 44A adapted to driven by a device, such as a power tool to rotate the drive axle 42 and the at least one gear 40 about the transverse third axis 24. The drive axle 42 includes a second drive head 44B adapted to driven by a device, such as a power tool to rotate the drive axle 42 and the at least one gear 40 about the transverse third axis 24. First drive head 44A extends outward in the transverse direction from one side of the lever body 28 and the second drive head 44B extends outward in the transverse direction from another side of the lever body 28. Chain binder is operable such that the at least one gear 40 moves in response to one (i) the ratchet mechanism 36 moving in response to movement of the lever body 28 about transverse second axis 22 and (ii) the drive axle 42 being driven about transverse third axis 24 by the device, such as a power tool, to rotate the at least one gear 40. The drive axle 42 defines third axis 24. Typically, only one mode of operation is operation at a single time. Stated otherwise, although it may be possible for an operation to both ratchet the lever body 28 and use a device 178 (FIG. 7), such as an electric driver or drill, or a torque wrench, at the same time, this is not typically the case, and an operator will ordinarily select one mode or the other.

Chain binder 10 includes a tubular assembly 45 having tubular member 46 with a second gear 48 fixedly attached to the tubular member 46. The second gear 48 is in rotational communication with the at least one drive gear 48, wherein a portion of the tubular member 46 extends in the transverse direction through the first boss 32A, the interior space 30, and the second boss 32B.

Chain binder 10 has a first hook 50A adjacent the first side 18 and a second hook 50B adjacent the second side 20, wherein movement of the drive assembly 39, namely, movement of at least one gear 40 is configured to move the first and second hooks 50A, 50B relative to each other to tension or relax an element, such as a chain or strap, to which the chain binder 10 is attached. While hook 50A and hook 50B are shown as open ended hooks, it is to be understood that any suitable connector would suffice. As such, the term hook can be any suitable connector that effectuates a permanent, semi-permanent, or releasable connection between two components. For example, other types of connectors that could be utilized on any embodiment of the chain binders detailed herein include carabineers, slide locks, rings, splices, lugs, tangs, or any other type of mechanical connectors. As such, the term connector may be used in the appended claim that includes the exemplary hooks 50A, 50B but also encompasses these other types of connectors.

On the chain binder 10, the drive axle 42 comprises an end 52A on the first drive head 44A and an end 52B on the second drive head 44B. Wherein the total length of the drive axle 42 extend from end 52A to end 52B and is aligned along third axis 24. A first portion of the length of the first drive 44A head is defined between the end 52A of first drive head 44A and the at least one gear 40. A second portion of the length of the second drive head 44B is defined between the end 52B of second drive head 44B and the at least one gear 40. There is a first indicator 54A on the first drive head 44A located between the end 52A and the at least one gear 40, wherein the first indicator 54A divides the first drive head 44A into a first portion 56A and a second portion 56B, wherein the end 52A is in the first portion 56A, and wherein the first portion 56A is sacrificially used to drive the at least one gear 40 and if the first portion 56A becomes damaged, then the first portion 56A may be sacrificed and cut off at the first indicator 54A to leave the second portion 56B connected to the at least one gear 40 and the second portion 56B may continue to be used by the device to drive the at least one gear 40 after the first portion 56A was sacrificed and discarded. There is a second indicator 54B on the second drive head 44B located between the end 52B and the at least one gear 40, wherein the second indicator 54B divides the second drive head 44B into a first portion 56C and a second portion 56D, wherein the end 52B is in the first portion 56C, and wherein the first portion 56C is sacrificially used to drive the at least one gear 40 and if the first portion 56C becomes damaged, then the first portion 56C may be sacrificed and cut off at the second indicator 54B to leave the second portion 56D connected to the at least one gear 40 and the second portion 56D may continue to be used by the device to drive the at least one gear 40 after the first portion 56C was sacrificed and discarded. In one embodiment, the first indicator 54A is a notch in an outer surface of the first drive head 44A. Similarly, the second indicator 54B may be a notch in an outer surface of the second drive head 44B. The first indicator 54A may be located at a location that divides the first portion 56A and the second portion 56B equally. The second indicator 54B may be located at a location that divides the first portion 56C and the second portion 56D equally. However, the indicators 54A, 54B may be located at different location to divide portions 56A, 56B and portions 56C, 56D into different lengths. In some implementations, the heads 44A, 44B of drive axle 42 have a hexagonal configuration and the indicators 54A, 54B are located at an edge of the hexagonal configuration. When a hexagonal configuration is utilized, the first indicator 54A may be one of six first indicators on the drive axle 42. The second indicator 54B may be one of six second indicators on the drive axle 42.

In one embodiment, the first pair of bosses 32 have the same diameter. The second pair of bosses 34 have the same diameter, however the diameter of the second pair of bosses is smaller than the diameter of the first pair of bosses 32. Stated otherwise, the diameter of the first pair of bosses 32 is larger than the diameter of the second pair of bosses 34. There is a pair of grease fittings 58 with a first grease fitting 58A on the first boss 32A and a second grease fitting 58B on the second boss 32B. The grease fittings 58A, 58B are in operative fluid communication with the interior space 30 of the lever body 28. There is a pair of grease fittings 60 with a first grease fitting 60A on the first boss 34A and a second grease fitting 60B (not seen in the Figures due to the orientation thereof) on the second boss 34B. The grease fittings 60A, 60B are in operative fluid communication with the interior space 30 of the lever body 28.

FIG. 1 and FIG. 2 depict the lever body 28 that includes a first portion 62AA and a second portion 62B that are largely structurally similar to each other. Second portion 62B has a cantilevered wall 66 extending from a side thereof when the first portion 62A and the second portion 62B are separated from each other.

First portion 62A includes a first end 68A opposite a second end 70A. First portion 62A includes a first major surface 72A opposite a second major surface 74A. A minor surface 76A is defined by the thickness of the first portion 62A and extends around the periphery of first portion 62A.

First portion 62A is formed generally in the shape of a rigid plate, preferably constructed of metal such as steel, that has a length extending between the first end 68A and second end 70A that is aligned in the longitudinal direction and offset parallel to axis 16. First portion 62A defines a plurality of transversely aligned apertures that extend fully through the plate or body of the first portion 62A from the first major surface 72A to the second major surface 74A. In one particular embodiment the first portion 62A defines at least one, or a plurality of bolt apertures 78A that extend transversely through first portion 62A. The bolt apertures 78A are located adjacent the second end 70A and are spaced apart from each other relative to the longitudinal direction in one particular embodiment. The bolt apertures 78A have a diameter. First portion 62A may also include a larger bolt aperture 80A that extends in a transverse direction through the plate of the first portion 62A between the first major surface 72A and the second major surface 74A. The larger bolt aperture 80A has a diameter that is larger than the bolt aperture 78A. Larger bolt aperture 80A is disposed approximately half-way between the first end 68A and the second end 70A. Stated otherwise, the larger bolt aperture 80A is located closer to the first end 68A than the at least one bolt aperture 78A.

The first end 68A of the first portion 62A is wider than the second end 70A of the first portion 62A. As such, the minor surface 76A flares outwardly at a neck region 82A and continues to span wider as the first and second surfaces 72A, 74A extend towards the first end 68A. The first end 68A may be defined by a rounded edge 84A. Between the neck region 82A and the rounded edge 84A, the first portion 62A defines an additional two apertures. Namely, first aperture 86A and a second aperture 88A extend fully through the widened portion 87A of the plate that defines the first portion 62A in the transverse direction between the first major surface 72A and the second major surface 74A. First aperture 86A has a larger diameter than the second aperture 88A. As will be described in greater detail below first aperture 86A receives tubular member 46 therethrough. Second aperture 88A receives the drive axle 42 therethrough.

First boss 32A is fixedly connected with first major surface 72A and extends outwardly in the transverse direction towards the first side 18. First boss 32A defines a bore 90A that is in open fluid communication with first aperture 86. In one embodiment the bore 90A (i.e., inner diameter of first boss 32A) may have the same diameter as first aperture 86A such that the outer diameter of first boss 32A may circumscribe the first aperture 86A. In the embodiment shown in FIG. 2, the first aperture 86A is slightly larger than the bore 90A (i.e., inner diameter of first boss 32A) such that the outer diameter of first boss 32A fits within first aperture 86A such that the outer cylindrical surface 92A fits within the first aperture 86A to allow the first boss 32A to be welded or fixedly connected to the first portion 62A at edge 94A that defines first aperture 86A. The first grease fitting 58A extends through the cylindrical sidewall of the first boss 32A and extends outwardly from cylindrical surface 92A. First grease fitting 58A is in open fluid communication with bore 90A and first aperture 86A to allow grease or other lubricants to be inserted through grease fitting 58A into the interior space 30 to lubricate gear 40 and gear 48.

First boss 34A is located closer to the second end 70A of the first portion 62A than the first boss 32A. First boss 34A is fixedly connected to the first major surface 72A and is disposed within the second aperture 88A. First boss 34A defines a bore 96A and an outer cylindrical surface 98A. In one particular embodiment, the outer diameter of first boss 34A is similar to the diameter defined by the circular edge 100A that defines the second aperture 88A to allow the first boss 34A to fit within aperture 88A and allow the first boss 34A to be fixedly welded to the first portion 62A. However, the inner diameter of bore 96A could be similar to the diameter of second aperture 88A to allow first boss 34A to circumscribed edge 100A. Grease fitting 60A extends through the cylindrical surface 98A of the first boss 34A. Grease fitting 60A is in open fluid communication with the bore 96A and the second aperture 88A to allow grease or other lubricant to enter into the interior space 30 to lubricate gear 40 and gear 48.

Second portion 62B includes a first end 68B opposite a second end 70B. Second portion 62B includes a first major surface 72B opposite a second major surface 74B. A minor surface 76B is defined by the thickness of the second portion 62B and extends around the periphery of second portion 62B.

Second portion 62B is formed generally in the shape of a rigid plate, preferably constructed of metal such as steel, that has a length extending between the first end 68B and second end 70B that is aligned in the longitudinal direction and offset parallel to axis 16. Second portion 62B defines a plurality of transversely aligned apertures that extend fully through the plate or body of the second portion 62B from the first major surface 72B to the second major surface 74B. In one particular embodiment the second portion 62B defines at least one, or a plurality of bolt apertures 78B that extend transversely through second portion 62B. The bolt apertures 78B are located adjacent the second end 70B and are spaced apart from each other relative to the longitudinal direction in one particular embodiment. The bolt apertures 78B have a diameter. Second portion 62B may also include a larger bolt aperture 80B that extends in a transverse direction through the plate of the second portion 62B between the first major surface 72B and the second major surface 74B. The larger bolt aperture 80B has a diameter that is larger than the bolt aperture 78B. Larger bolt aperture 80B is disposed approximately half-way between the first end 68B and the second end 70B. Stated otherwise, the larger bolt aperture 80B is located closer to the first end 68B than the at least one bolt aperture 78B.

The first end 68B of the second portion 62B is wider than the second end 70B of the second portion 62B. As such, the minor surface 76B flares outwardly at a neck region 82B and continues to span wider as the first and second surfaces 72B, 74B extend towards the first end 68B. The first end 68B may be defined by a rounded edge 84B. Between the neck region 82B and the rounded edge 84B, the second portion 62B defines an additional two apertures. Namely, first aperture 86B and a second aperture 88B extend fully through the widened portion 87B of the plate that defines the second portion 62B in the transverse direction between the first major surface 72B and the second major surface 74B. First aperture 86B has a larger diameter than the second aperture 88B. As will be described in greater detail below first aperture 86B receives tubular member 46 therethrough. Second aperture 88B receives the drive axle 42 therethrough.

Second boss 32B is fixedly connected with first major surface 72B and extends outwardly in the transverse direction towards the second side 20. Second boss 32B defines a bore 90B that is in open fluid communication with first aperture 86. In one embodiment the bore 90B (i.e., inner diameter of second boss 32B) may have the same diameter as first aperture 86B such that the outer diameter of second boss 32B may circumscribe the first aperture 86B. In the embodiment shown in FIG. 2, the first aperture 86B is slightly larger than the bore 90B (i.e., inner diameter of second boss 32B) such that the outer diameter of second boss 32B fits within first aperture 86B such that the outer cylindrical surface 92B fits within the first aperture 86B to allow the second boss 32B to be welded or fixedly connected to the second portion 62B at edge 94B that defines first aperture 86B. The second grease fitting 58B extends through the cylindrical sidewall of the second boss 32B and extends outwardly from cylindrical surface 92B. Second grease fitting 58B is in open fluid communication with bore 90B and first aperture 86B to allow grease or other lubricants to be inserted through grease fitting 58A into the interior space 30 to lubricate gear 40 and gear 48.

Second boss 34B is located closer to the second end 70B of the second portion 62B than the first boss 32B. Second boss 34B is fixedly connected to the first major surface 72B and is disposed within the second aperture 88B. Second boss 34B defines a bore 96B and an outer cylindrical surface 98B. In one particular embodiment, the outer diameter of second boss 34B is similar to the diameter defined by the circular edge 100B that defines the second aperture 88B to allow the second boss 34B to fit within aperture 88B and allow the second boss 34B to be fixedly welded to the second portion 62B. However, the inner diameter of bore 96B could be similar to the diameter of second aperture 88B to allow second boss 34B to circumscribe edge 100B. Grease fitting 60B extends through the cylindrical surface 98B of the second boss 34B. Grease fitting 60B is in open fluid communication with the bore 96B and the second aperture 88B to allow grease or other lubricant to enter into the interior space 30 to lubricate gear 40 and gear 48.

Figure 5:
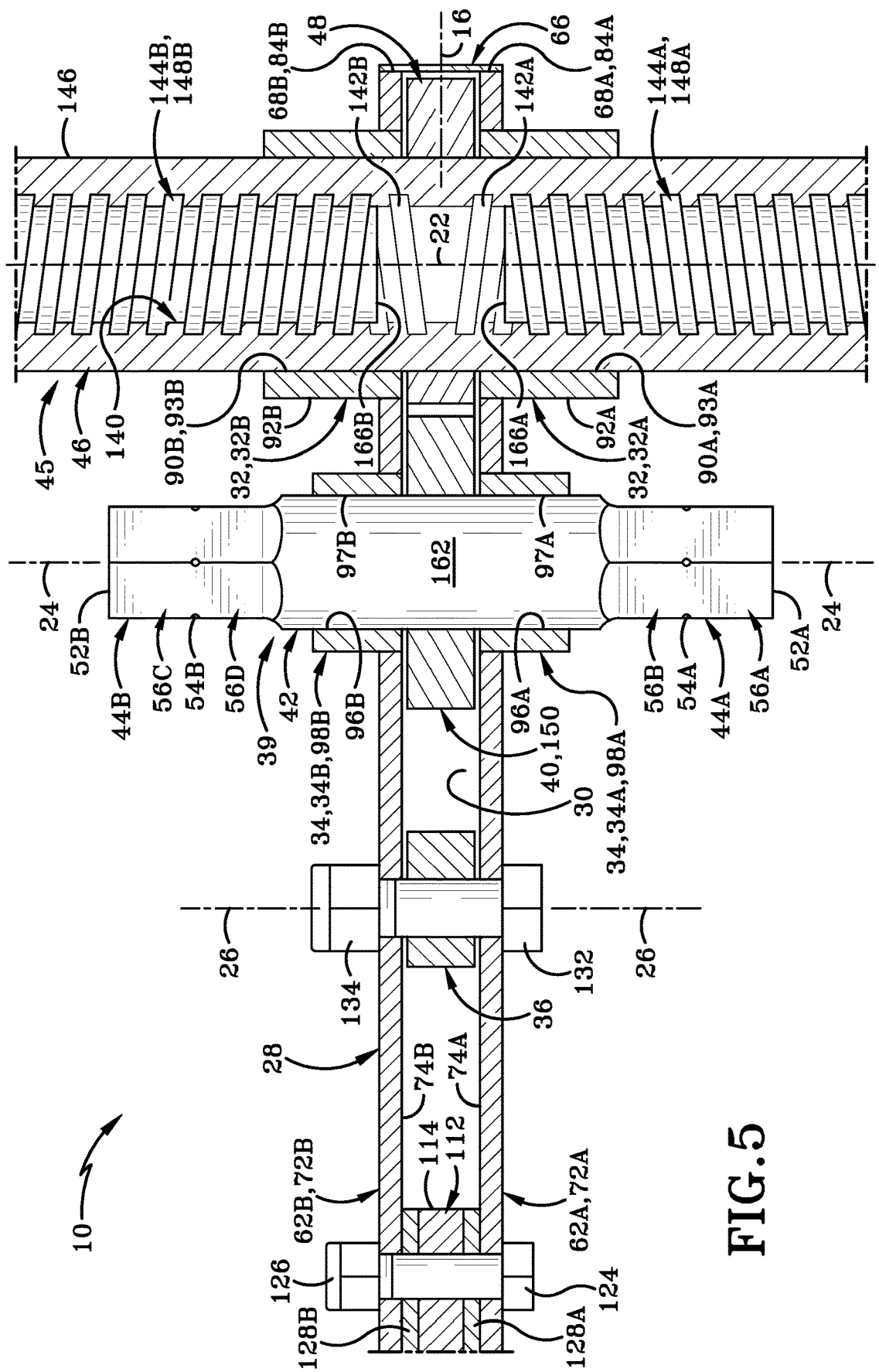
FIG. 5 is a longitudinal top cross-section view of the lever body taken along line 5-5 in FIG. 1.

Wall 66 includes a first end 102 and a second end 104. First end 102 is disposed adjacent the neck region 82B and the wall 66 extends longitudinally from neck region 82B towards the first end 68B. Wall 66 is conformal and wraps around the rounded edge 84B and extends longitudinally towards the second end 70B terminating at the second end 104 adjacent neck region 82B. In one particular embodiment wall 66 is welded to the first portion 62A and the second portion 62B. Thus, wall 66 is only a cantilevered wall when it is connected to one of the first portion 62A and the second portion 62B. When chain binder 10 is fully assembled, the wall 66 extends between first portion 62A and second portion 62B and is rigidly connected to both portions 62A, 62B. In one particular embodiment, wall 66 may be fixedly connected with destructable connections, such as tack welds that may be cut or grinded/ground away (i.e., severed) in the event that the interior space 30 needs to be accessed to replace damaged components, such as the drive assembly 39 (i.e., either the drive axle 42, gear 40, or both) or the tubular assembly 45 (i.e., either tubular member 46, gear 48, or both). The width of the wall 66, which is aligned in the transverse direction, may be slightly greater than the width of gear 40 and/or gear 48 (as shown in FIG. 5). Wall 66 includes an interior surface 108 and an exterior surface 110. The interior surface 108 of wall 66 partially bounds and defines interior space 30.

Lever body 28 also includes a handle 112. Handle 112 includes a first end 114 and a second end 116 that defines the second end 14 of chain binder 10. Handle 112 is centered along axis 16 and extends in the longitudinal direction. Handle 112 also is generally a rigid elongated plate, formed of metal such as steel, having side major surfaces 118 and 120. Adjacent the first end 114 of handle 112, there are transversely aligned through apertures 122. Apertures 122 are transversely aligned with aperture 78A on first portion 62A of lever body 28 and aligned with aperture 78B on second portion 62B. Apertures 122 and apertures 78A, 78B are configured to receive a bolt 124 there through that couples with nut 126 to rigidly secure handle 112 to first portion 62A and second portion 62B of lever body 28. Near the second end 116 of handle 112 is formed a gripping surface 127 defining a wave-like configuration having alternating peaks and valleys to assist with gripability for the operator maneuvering handle 112 to operate the lever body 28.

The lever body 28 includes spacer plates 128A and 128B located on respective sides of the handle 112. Spacer plates 128A, 128B sandwich the handle 112 therebetween and are formed with apertures that receive bolt 124 there through. Spacer plates can be formed from any rigid or semi-rigid material, such as metal or a polymer material.

The pawl 38 of ratchet mechanism 36 is disposed between first portion 62A and second portion 62B of lever body 28. Pawl 38 defines an aperture 130 that is aligned with aperture 80A and aperture 80B. A larger bolt 132 that defines axis 26 extends through apertures 80A, 80B and through aperture 130. Bolt 132 is secured by nut 134 to retain pawl 38 between first portion 62A and second portion 62B of lever body 28. Pawl 38 is configured to rotate about axis 26 to engage the cogs of the at least one gear 40 in a ratcheting manner.

Tubular member 46 is a rigid member preferably constructed of metal such as steel. Tubular member 46 includes a first end 136 and a second end 138. The length of the tubular member extends between the first end 136 and the second end 138, wherein the length of the tubular member 46 is aligned in the transverse direction and centered along axis 22 tubular member 46 defines a bore 140. The interior surface of the tubular member that defines bore 140 may be entirely threaded through the bore 140 or partially threaded near the first end 136 and the second end 138. The threads 142 engage first and second eye-bolts 144A, 144B. The exterior cylindrical surface 146 is rigidly secured with gear 48. In one particular embodiment, gear 48 is centered along the length of tubular member 46. Gear 48 has cogs that engage complementary cogs on gear 40. Tubular member 46 rotates about axis 22 in response to movement of the at least one gear 40. As described herein, movement of the gear 48 effectuates rotational movement of the tubular member 46. This imparts the threads 142 to operationally engage complementary threads 148A, 148B on the eye-bolts 144A, 144B. The engagement of threads 142A with threads 148A and threads 142B with threads 148B during operational movement imparts rotation-to-translation movement of the eye-bolts 144A, 144B in the transverse direction along axis 22. The rotation-to-translation movement of eye-bolts 144A, 144B imparts tension to the device, chain or strap to which hooks 50A, 50B are connected when the eye-bolts 144A, 144B are translated towards each other and it relaxes the tension on the device, chain or strap when the eye-bolts 144A, 144B are translated away from each other.

Figure 3:
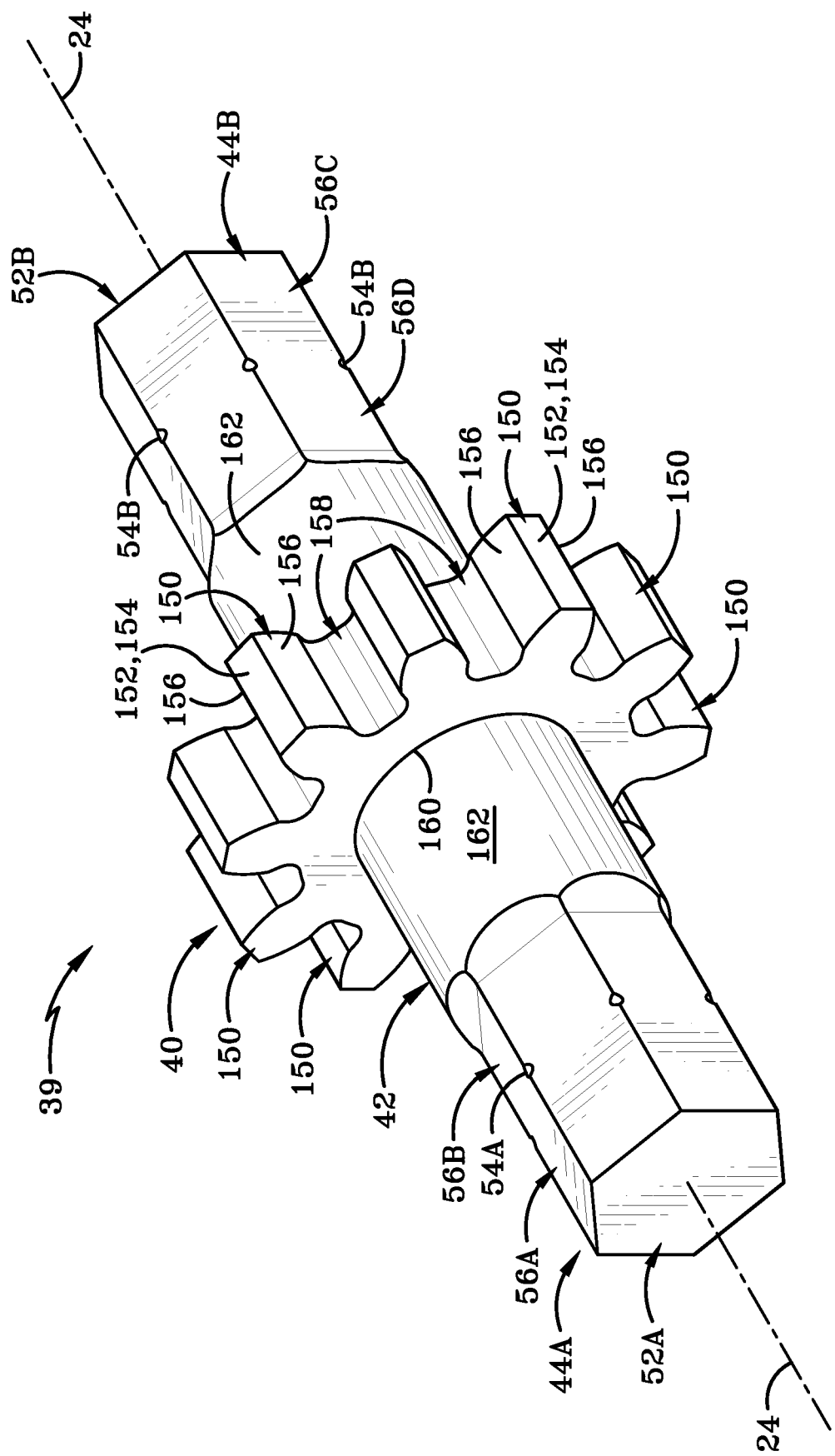
FIG. 3 is a top perspective view of the drive gear and drive axle of the chain binder according to one exemplary embodiment of the present disclosure.

FIG. 3 depicts the drive assembly 39 including drive axle 42 with the drive gear 40 fixedly connected thereto. Drive gear 40 and drive axle drive 42 are fixedly connected to such that drive assembly 39 forms or defines a unitary component formed from rigid material, such as steel. However, it is not requirement that the drive gear 40 and drive axle drive 42 are formed from the same rigid material. Gear 40 includes a plurality of cogs 150 that extend circumferentially around gear 40. Cogs 150 extend radially outward from axis 24 to terminal end 152, which may be flat or planar and define a flat surface 154 that is offset parallel to axis 24. Cogs 150 may have rounded or convexly curved sidewalls 156 that extend radially from the flat surface 154 towards axis 24. The curved sidewall 156 terminates at a U-shaped surface 158 defining a valley between adjacent cogs 150. Gear 40 is fixedly connected to drive axle 42 at edge 160.

In the configuration shown in FIG. 3, the hexagonal ends 52A, 52B of the drive axle 42 do not extend fully to edge 160. Rather, the center portion of the drive axle 42 is cylindrical having a smooth convex exterior surface 162. The cylindrical convex surface 162 is disposed within first boss 34A and second boss 34B. This allows drive axle 42 to rotate about axis 24 within bore 96A of first boss 34A and rotate within bore 96B of second boss 34B. Further the placement of surface 162 within the bores 96A, 96B allows for the hexagonal ends 52A, 52B to project outwardly in the transverse direction from the respective sides of the lever body 28. When assembled, the cylindrical surface 162 is closely adjacent the interior surface of bosses 34A, 34B that define bore 96A and bore 96B, respectively. When grease or lubricant is applied to grease fittings 60A, 60B the grease may cover surface 162 as the grease moves towards gear 40 to coat the cogs 150. The number of cogs 150 on gear 40, as well as the diameter of gear 40, may vary depending on the application specific needs of chain binder 10. In shown configuration, there are ten cogs on gear 40. However, the number of cogs 150 could be increased or decreased depending on the desired gear ratio and size of the chain binder 10.

As will be described herein, the first portion 56A of hexagonal end 52A and the first portion 56C of hexagonal end 52B are considered to be sacrificial ends. Stated otherwise, even though the drive axle 42 is formed from a rigid metal, there is still a chance that the hexagonal ends 52A, 52B may "strip" or "wear down" over time due to the high stress/strain forces applied when a device, such as a drill or torque wrench, is coupled with one of the ends 52A, 52B. The "stripping" or "wearing" of the hexagonal ends 52A, 52B is considered a detrimental or damaging event that would ordinarily render a tool ineffective or inoperable. As such, the drive axle 42 is configure to allow for the damaged ends to be severed and sacrificed (i.e., cut off or grinded/ground away) and discarded in order to reveal a "fresh" or "new" end that maintains the preferred hexagonal configuration for use with a socket or drive nut of the device (i.e., a pneumatic or electric drill, or a torque wrench). In the event that all four portions (i.e., 56A, 56B, 56C, and 56D) of the hexagonal configuration are damaged or stripped, then the entire unitary component formed from the drive axle 42 and drive gear 40 may be replaced, as detailed below, which is a great cost savings as opposed to having to replace the entire chain binder when one components fails.

Figure 4:
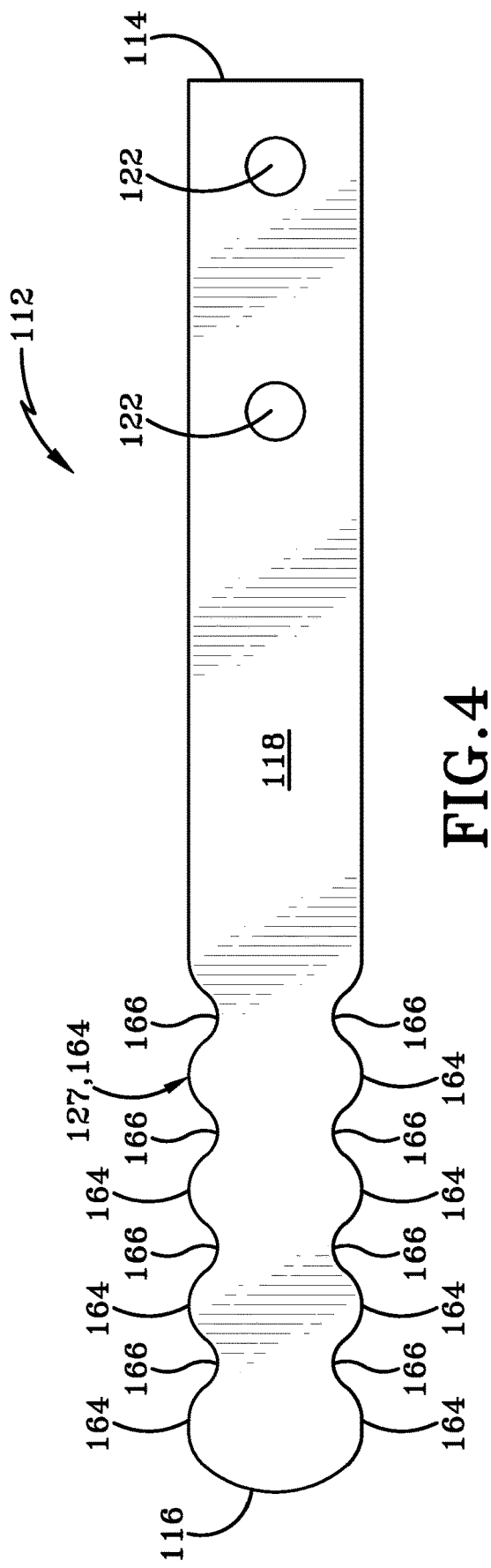
FIG. 4 is a side elevation view of a handle on the lever body according to one exemplary embodiment of the present disclosure.

FIG. 4 depicts the wave-like configuration of griping surface 127 at the second end 116 of handle 112. The wave-like configuration may be defined by corresponding peaks 164 and valleys 166. The peaks 164 and valleys 166 provide an ergonomic handle design of the gripping surface 127 for an operator to grasp or grip when moving the handle 112 to manually ratchet the lever body 28 to impart rotational drive movement to the drive gear in a manual manner. The movement of handle 112 causes the drive gear to engage gear 48. Rotational movement of gear 48 imparts rotation-to-translation movement of eye bolts 144A, 144B to increase tension or relax tension on a chain, strap, or the like to which hooks 50A, 50B are coupled.

FIG. 5 depicts a cross section of the lever body 28. Within the tubular member 46, the threads 148A of eye-bolt 144A and threads 148B of eye-bolt 144B are shown. More particularly threads 148A on eye-bolt 144A have a first spiral configuration and the threads 148B of eye-bolt 144B have a second configuration. In one particular embodiment the threads 148A, 148B on the respective eye-bolts 144A, 144B are an equal but oppositely wound. Thus, when the tubular member 46 rotates about axis 22 in a first direction the end 166A of eye-bolt 148A translates away from the end 166B of the second eye-bolt 144B. Additionally, when the tubular member 46 rotates in an opposite second direction about axis 22 the ends 166A, 166B translate towards each other. This movement is effectuated by the threads 142A and threads 142B that defined the interior surface of tubular member 46 that are equal and opposite each other on respective sides of axis 16.

When tubular member 46 is disposed within the first boss 32A and the second boss 32B the exterior surface 146 is closely adjacent the interior surface of bosses 32A, 32B that enables the exterior surface 146 of tubular member 46 to be lubricated or greased when a lubricant is applied to either one or both of first grease fitting 58A and second grease fitting 58B. The grease may enter through either one of the grease fittings 58A, 58B (or grease fittings 60A, 60B) to enter into the interior space 30 to lubricate gear 40 and gear 48.

The positioning of the tubular member 46 within first boss 32A and second boss 32B may provide the benefit of the bosses functioning a race of a bearing or a race bearing. More particularly, the when tubular member 46 is disposed within first boss 32A and second boss 32B, the bosses 32A, 32B function as an outer race. While no rolling elements are depicted in the figures, it is possible for them to be added to this design without departing from the scope of the disclosure. However, when rolling elements are not utilized, there should be a tight tolerance between outer surface 146 of tubular member 46 and the inner surface 93A that defines bore 90A and the inner surface 93B that defines bore 90B. In some instances, the term tight tolerance reference to less than about ½ inch. In other instances, the term tight tolerance refers less than about ¼ inch. Or, the tight tolerances can refer to the two elements directly contacting each other with grease or lubricant on their surfaces. The width of each of the bosses 32A, 32B (measured in the transverse direction) may be in a range from about one inch to about two inches. In one particular embodiment, the width of each of the bosses 32A, 32B is about 1.5 inches. In some instances, there may some criticality to the tight tolerances and range of widths to assist the bosses 32A, 32B functioning as an outer race of a bearing for rotating tubular member 46 about axis 22. Further, there may some criticality to the tight tolerances and range of widths to assist reducing wear on the components of chain binder 10 that is ordinarily caused in the absence of a bosses on a conventional chain binder. Consequently, the bosses 32A, 32B avoid some of the excessive wear concerns in a conventional chain binder.

With continued reference to FIG. 5, the positioning of the drive axle 42 within first boss 34A and second boss 34B may provide the benefit of the bosses functioning a race of a bearing or a "race bearing." More particularly, the when drive axle 42 is disposed within first boss 34A and second boss 34B, the bosses 34A, 34B function as an outer race. While no rolling elements are depicted in the figures, it is possible for them to be added to this design without departing from the scope of the disclosure. However, when rolling elements are not utilized, there should be a tight tolerance between outer surface 162 of drive axle 42 and the inner surface 97A that defines bore 96A and the inner surface 97B that defines bore 96B. In some instances, the term tight tolerance reference to less than about ½ inch. In other instances, the term tight tolerance refers less than about ¼ inch. Or, the tight tolerances can refer to the two elements directly contacting each other with grease or lubricant on their surfaces. The width of each of the bosses 34A, 34B (measured in the transverse direction) may be in a range from about ½ inch to about 1.5 inches. In one particular embodiment, the width of each of the bosses 34A, 34B is about one inch. In some instances, there may some criticality to the tight tolerances and range of widths to assist the bosses 34A, 34B functioning as an outer race of a bearing for rotating drive axle 42 about axis 24. Further, there may some criticality to the tight tolerances and range of widths to assist reducing wear on the components of chain binder 10 that is ordinarily caused in the absence of a bosses on a conventional chain binder. Consequently, the bosses 34A, 34B avoid some of the excessive wear concerns in a conventional chain binder.

The width of the boss 32A is measured in the transverse direction, as shown in cross section of FIG. 5. The width of the boss 34A (which may also be referred to as a "third boss" in the appended claims due to nomenclature of the first boss 32A and second boss 32B is measured in the transverse direction. In one particular embodiment of chain binder 10, the width of the first boss 32A is greater than the width of the boss 34A (i.e., third 34A), however that is not required in every embodiment. There is a ratio of the width of the first boss 32A to the width of boss 34A (i.e., the third boss). When the width of the first boss is 1.5 inches and the width of the boss 34A is one inch, then the ratio is about 1.5:1. However, other embodiments prove useful when the ratio is a range from 4:1 to 1:1.5. A ratio of 4:1 would mean that the width of boss 32A is two inches and the width of boss 34A is ½ inch. A ratio of 1:1.5 would mean that the width of boss 32A is one inch and the width of boss 34A is 1.5 inches (this would be an example of another embodiment in which the width of the boss 34A is greater than the width of the boss 32A). Any ratio within these ranges are suitable depending on application specific needs of chain binder 10 to functionally reduce wear and on the components while enabling bosses 32A, 34A to act as race bearings as previously described. The same ratios and widths are equally applicable to bosses 32B, 34B for the same purpose.

Figure 6:
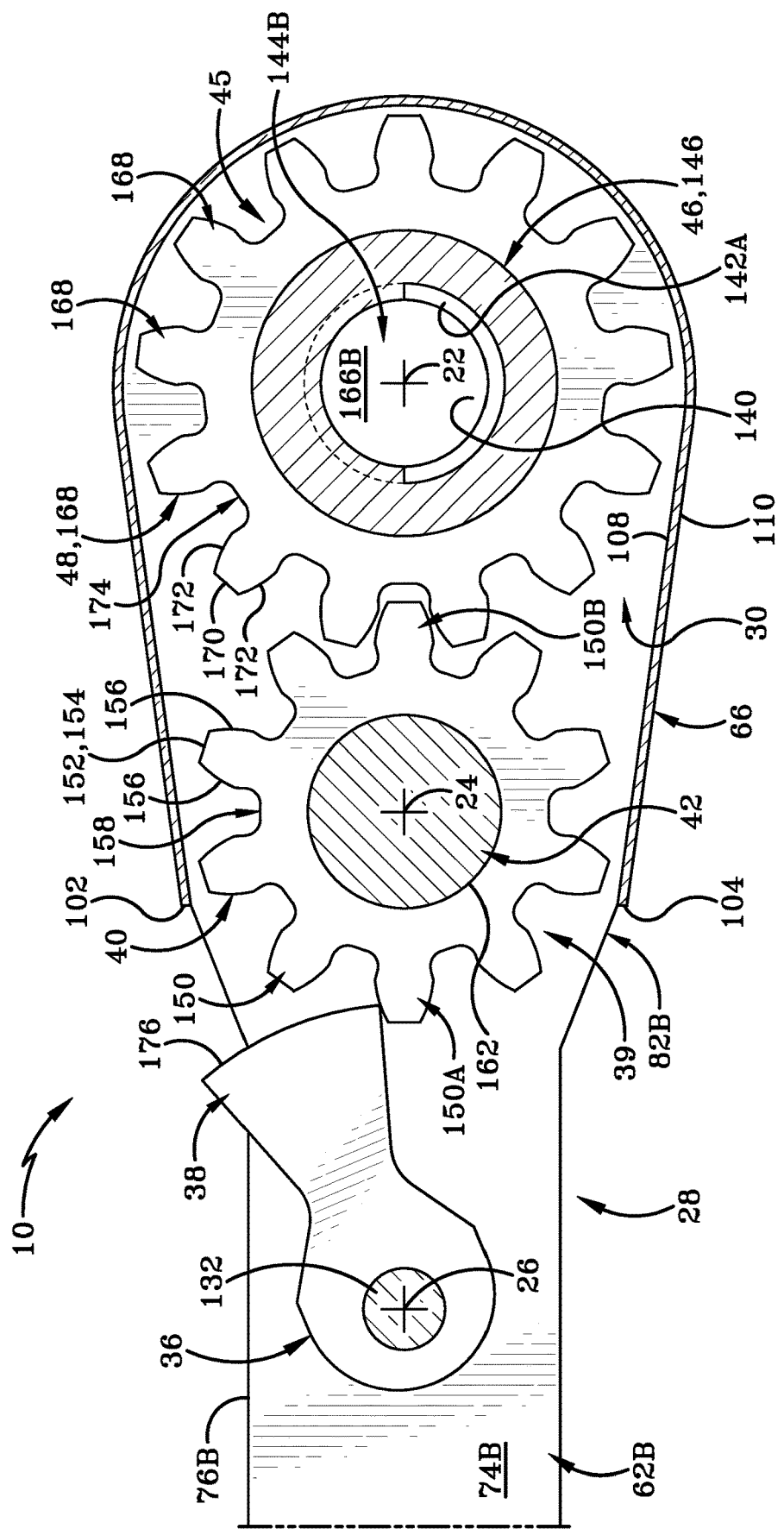
FIG. 6 is a longitudinal side cross-section view of the lever body taken along line 6-6 in FIG. 1.

FIG. 6 depicts the gear 48 as having a plurality of cogs 168. The cogs 168 on gear 48 are shaped similar to that of cogs 150 on gear 40 in that the cogs 168 include a flat surface 170, a curved sidewall 172, and a u-shaped valley 174 defining a space between adjacent cogs on gear 48.

When gear 40 interacts with gear 48, the cogs 150 on gear 40 are disposed in a complementary valley of gear 48. Thus, rotational movement of gear 40 imparts rotational movement of gear 48. In the shown embodiment, gear 48 includes thirteen cogs 168. Thus, the two gears 40, 48 may collectively define a ten-thirteen gear train ratio. While this gear train configuration or gear ratio is envisioned, other gear train or gear ratio-configurations are possible depending on the application specific needs of chain binder 10 and the torque needed to impart rotational-to-translation movement of the eye-bolts 144A, 144B.

As with continued reference to FIG. 6, gear 40 is disposed between gear 48 and pawl 38. The end 176 of pawl 38 engages one of the cogs 150 on gear 40. In one particular embodiment, the end 176 of pawl 38 engages the cog that is diametrically opposite the cog that engages gear 48. For example, when the end 176 of pawl 38 engages cog 150A, the cog 150B that is diametrically opposite cog 150A (relative to axis 24), engages the valley defined by u-shaped wall 174 between adjacent cogs 168 on gear 48.

As described previously, chain binder 10 has two modes of operation. Namely, a power driven first mode of operation in which a device, such as an electric drill 178 or torque wrench, can be used to impart rotational movement to gear 40 via drive axle 42 and a second manual mode of operation in which the handle 112 is maneuvered to utilize a manual lever action to ratchet and rotate gear 40.

Figure 7:
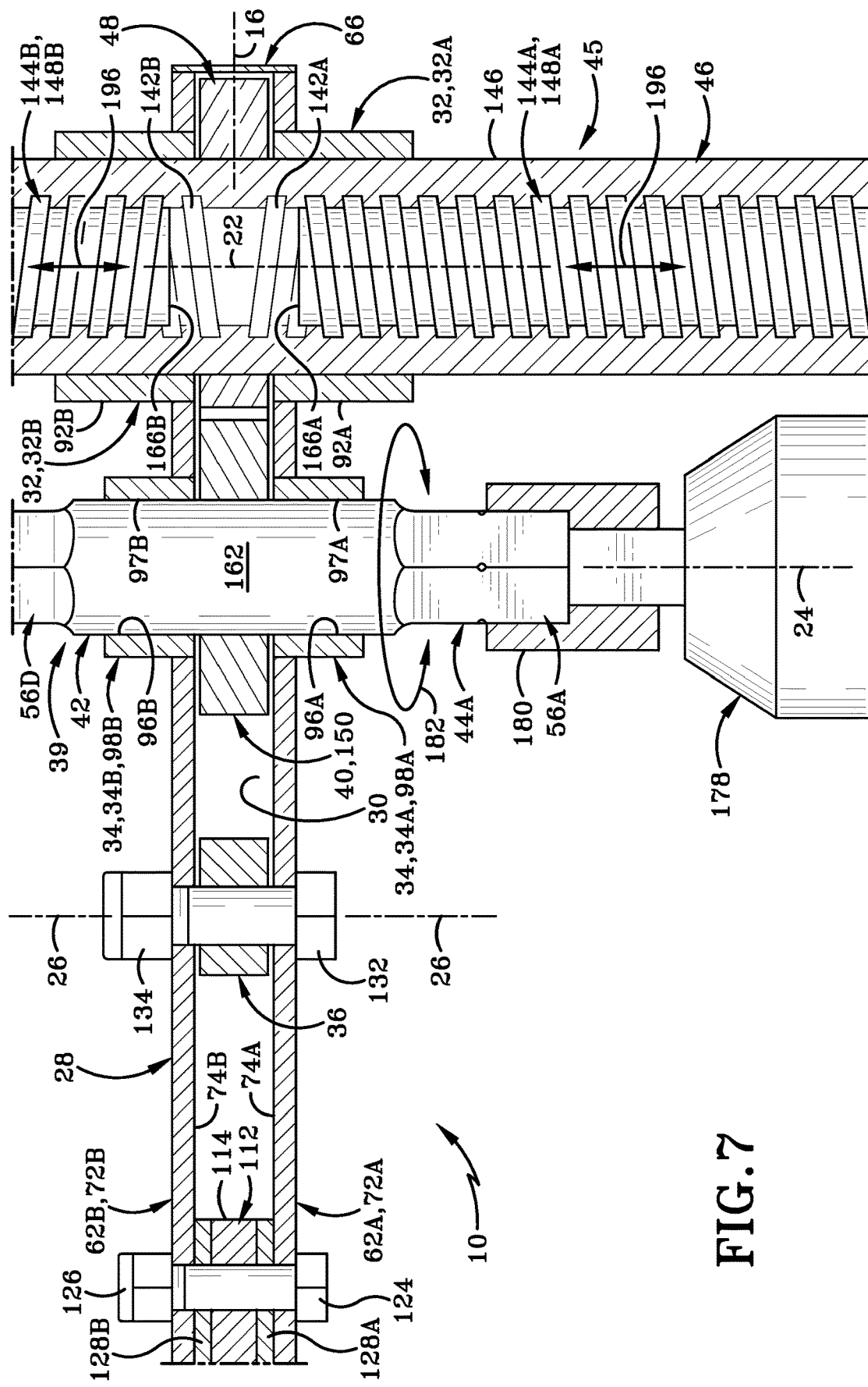
FIG. 7 is an operational longitudinal top cross-section view of the lever body taken along line 5-5 in FIG. 1

FIG. 7 depicts the power driven first mode of operation in which the electric drill, pneumatic drill, torque wrench or other similar device is coupled to the drive axle 42 to impart a rotation movement of the drive axle about axis 24. For the shown example, the electric drill 178 (which could also be any other type of device, such as a pneumatic drill, a hydraulic drill, or a torque wrench, or any other) includes a socket or nut driver 180 that is sized with a complementary hexagonal configuration that receives one end of the drive axle 42. In the shown configuration, the socket is coupled with the first end 52A of first drive head 44A of drive axle 42. When the socket 180 is coupled to the first end 52A of first drive head 44A, the socket 180 receives the first portion 56A of the first drive head 44A. The electric drill 178 may be powered to rotate the socket 180 and thus impart rotation to the drive axle 42 as indicated by arrow 182.

Figure 8A:
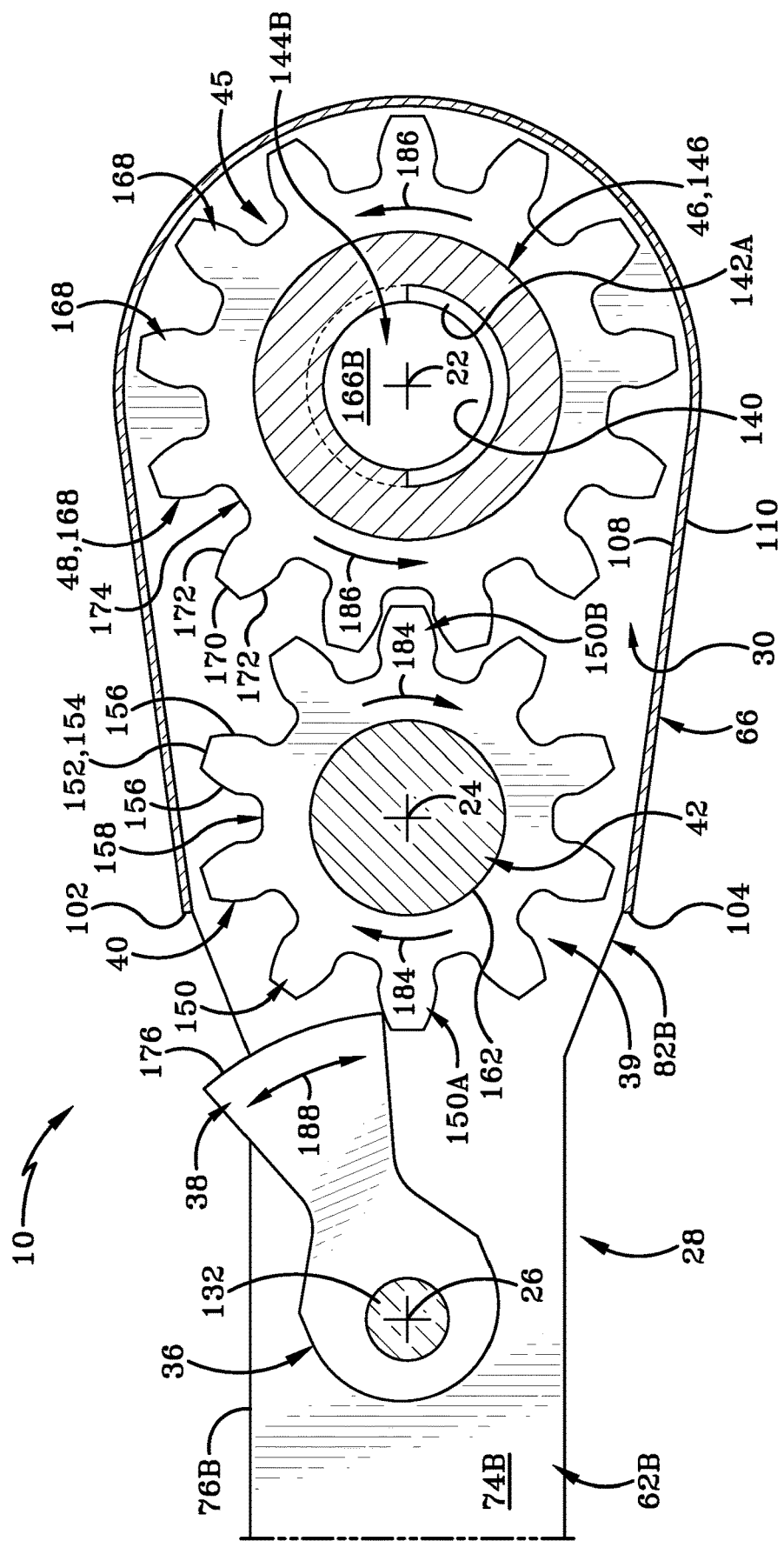
FIG. 8A is an operational longitudinal side cross-section view of the lever body taken along line 6-6 in FIG. 1.

As depicted in FIG. 7 and FIG. 8A, when the drive axle 42 is driven by electric drill 178, the rotational movement of the drive axle 42 imparts rotational movement to the at least one drive gear 40. The interacting gears 40, 48 cause rotational movement with each other. Namely, when the at last one drive gear 40 rotates in a first direction as indicated by arrow 184, the gear 48 is caused to be rotated in a second direction, as indicated by arrow 186, wherein the second direction identified by arrow 186 (e.g. counterclockwise) is opposite that of arrow 184 (e.g. clockwise). When the drive gear 40 moves in the direction of arrow 184, the pawl 38 is free to pivot about axis 26 in the direction indicated by arrow 188 this allows free movement of gear 40 in the direction indicated by arrow 184.

Figure 8B:
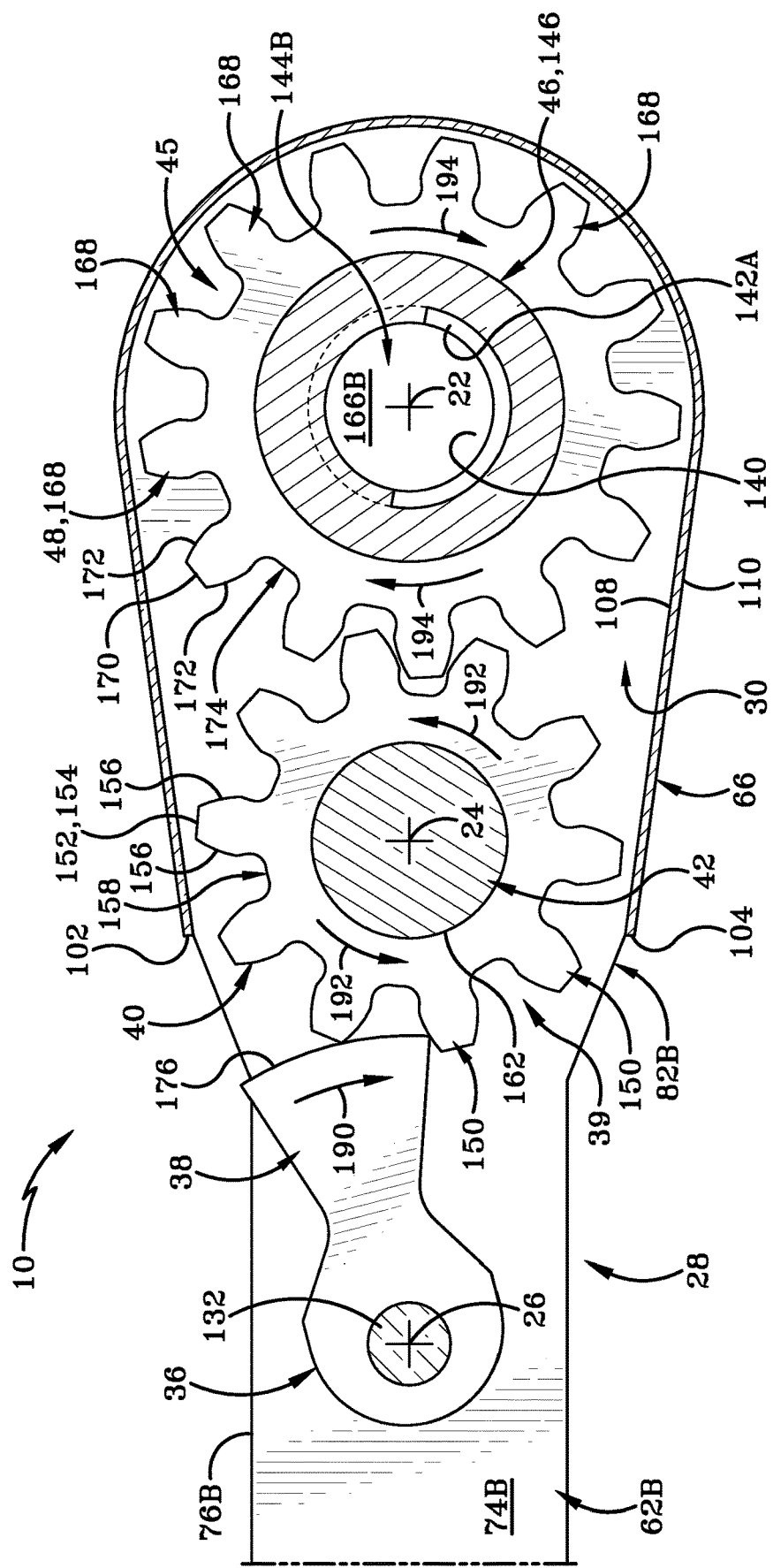
FIG. 8B is an operational longitudinal side cross-section view of the lever body taken along line 6-6 in FIG. 1.

FIG. 8B depicts the ratcheting feature of pawl 38 that would be utilized when the chain binder 10 is used in the manual second mode of operation that is effectuated by a user maneuvering the handle 112 of lever body 28 to pivot the lever body about axis 22. In response to pivoting action of the lever body about the axis 22, the end 176 of pawl 38 moves in the direction indicated by arrow 190. This drives the rotation of gear 40. Namely, when the pawl 38 moves in the direction of arrow 190, the gear 40 is rotates in the direction of the arrow 192 and the gear 48 rotates in the direction indicated by arrow 194.

With continued reference to FIG. 7, FIG. 8A, and FIG. 8B, the rotational movement of gears 40 and 48 cause the tubular member 46 to rotate within the first pair of bosses 32. As the tubular member 46 rotates about axis 22, linear movement is imparted to the threads 148A, 148B of eye-bolts 144A, 144B, respectively. The linear translation of the eye-bolts 144A and 144B are indicated by arrows 196. When the ends 166A, 166B are translated closer together the chain binder 10 applies tension to the chain or strap to which hooks 50A, 50B are connected. When the ends 166A and 166B are translated away from each other, this relaxes (i.e., decrease tension) the chain or strap to which hooks 50A, 50B are connected.

Figure 9:
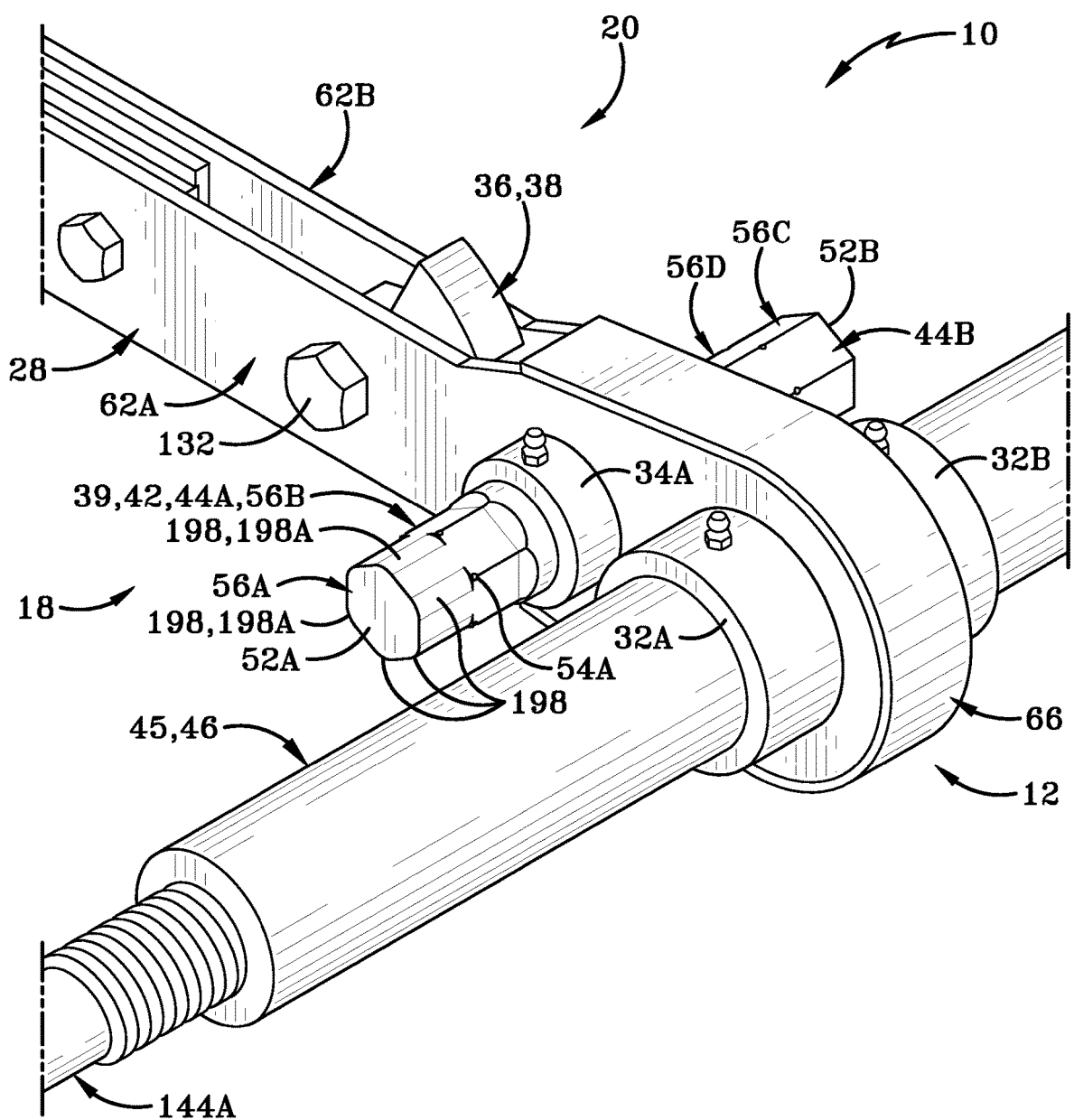
FIG. 9 is an operational top perspective view of the first drive head having been damaged when the edges of the drive head are rounded.

FIG. 9 further details one exemplary advantage of the present disclosure. As may happen from time-to-time when using an electric tool, such as a drill or nut driver, or other tool, such as a torque wrench, to effectuate rotation of drive axle 42 (as depicted in FIG. 7), there is a chance that the tool has too much torque that can strip or wear down the edges of the drive head 44A (or head 44B). FIG. 9 depicts such a scenario where the first drive head 44A has been stripped such that the longitudinal edges defining the hexagonal configuration of head 44A become rounded at rounded portions 198, which damage the first drive head 44A. The rounded edges 198A typically extend from end 52A to the first indicator 54A when the edges are rounded at rounded edge 198A, it makes it difficult for the socket 180 to grasp the first drive head 44A to impart the rotational action, indicated by arrow 182, in order to drive the components for chain binder 10. As such, one exemplary advantage of the present disclosure is that the drive axle has sacrificial portions that can be severed or removed once they are damaged or if they become damaged.

Figure 10A:
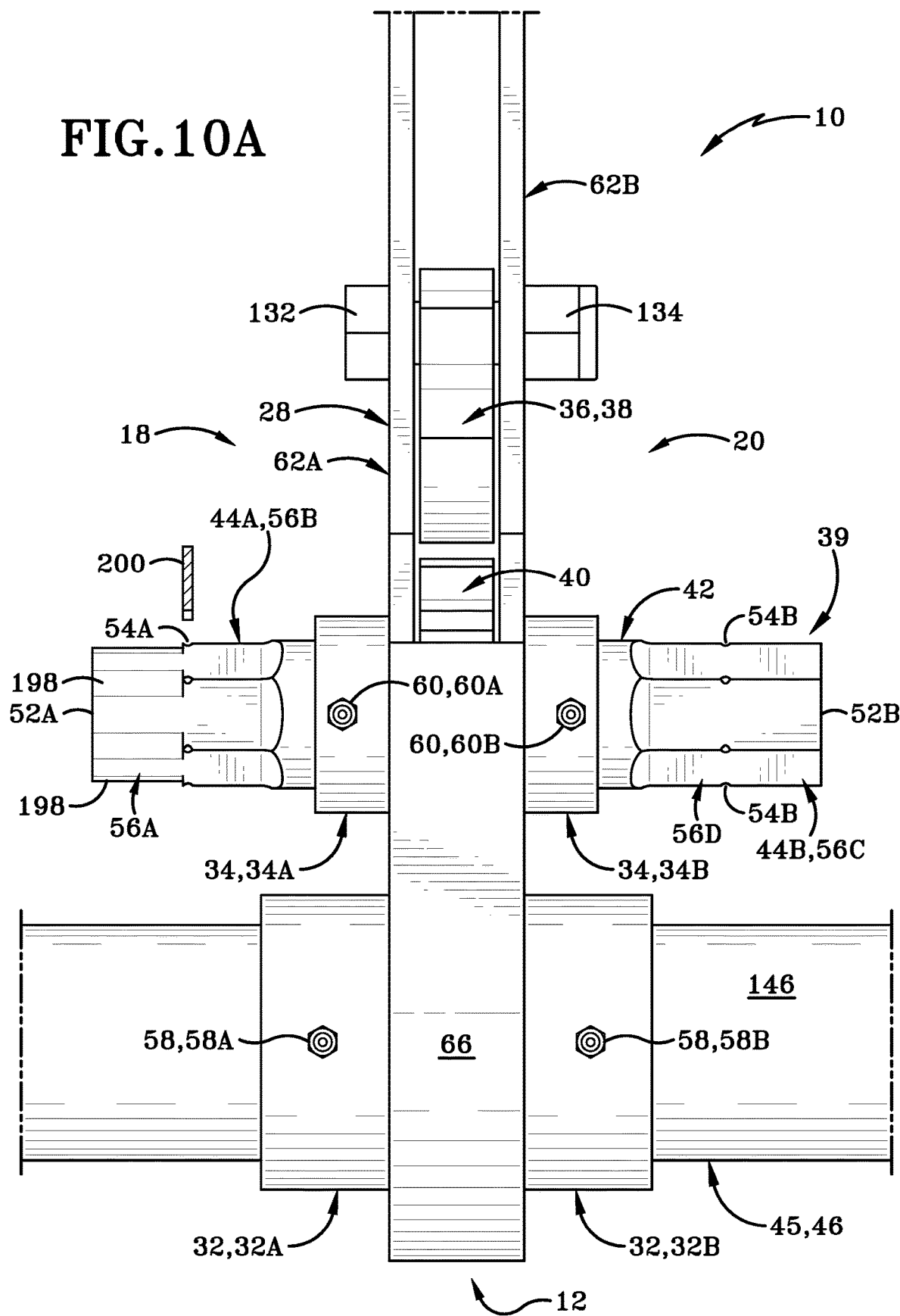
FIG. 10A is an operational top plan view of lever body when the first portion of the first drive head is to be removed after having been damaged.
Figure 10B:
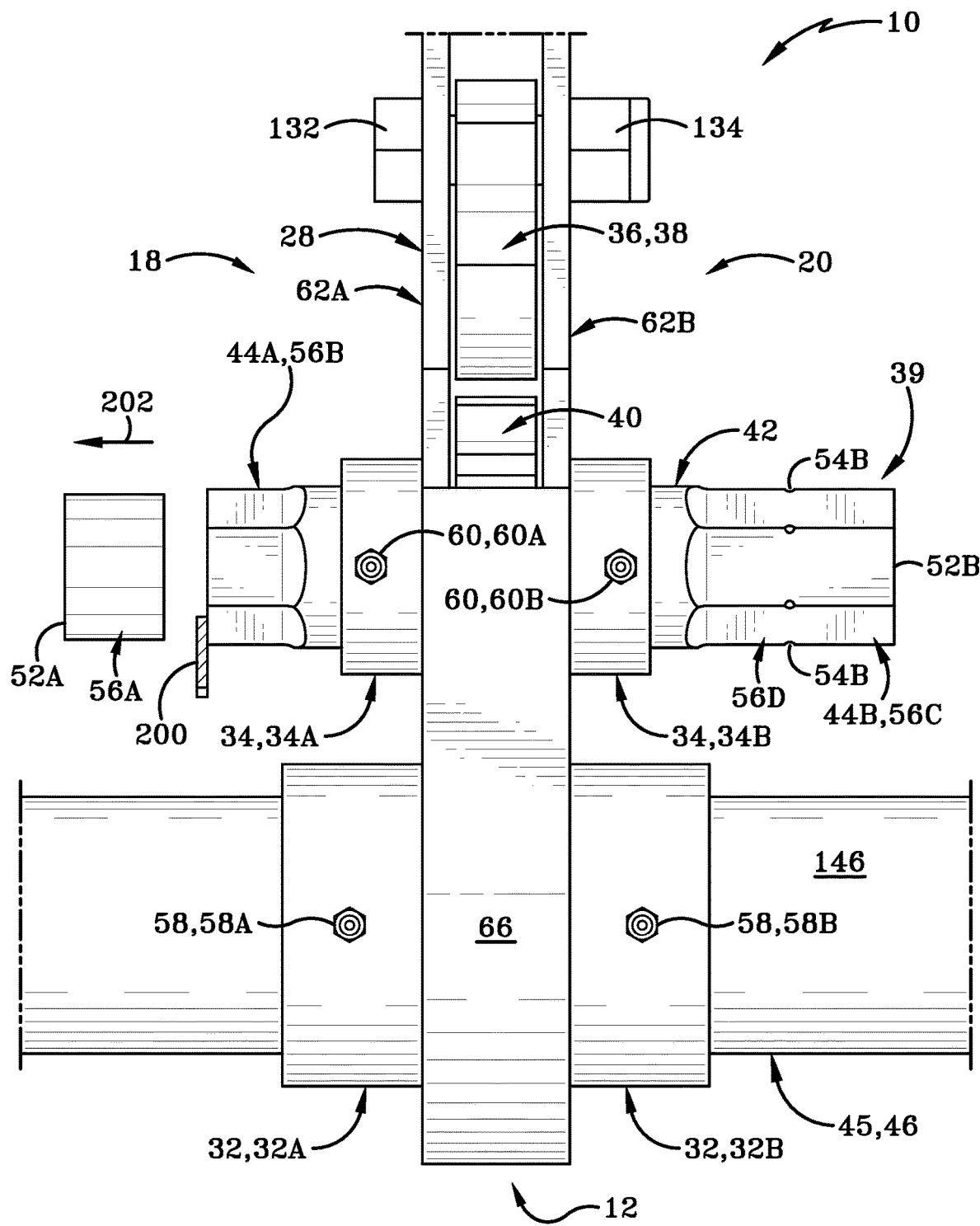
FIG. 10B is an operational top plan view of lever body depicting the first portion of the first drive head being removed and discarded after having been damaged.

FIG. 10A and FIG. 10B depict the scenario in which the first portion 56A of the first drive head 44A has been damaged due to rounded edges 198A caused by the socket 180 of the electric drill or electric device 178. A saw blade 200 (or electric grinder) may be used to cut the first drive head 44A at the first indicator 54A. FIG. 10A depicts aligning the saw 200 (or grinder) with the indicator 54A. FIG. 10B depicts the saw blade 200 (or grinder) cutting through the first drive head 44A at indicator 54A remove the first portion 56A so that the damaged first portion 56A (i.e., damaged due to having rounded edge 198A) may be sacrificed and discarded. The removal and sacrifice/severance of first portion 56A is indicated by arrow 202. After the first portion 56A has been removed and discarded as indicated in FIG. 10B, the second portion 56B of first drive head 44A is exposed and may be used by electric drill 178 (or torque wrench or the like) by fitting socket 180 onto second portion 56B in order to drive the drive axle 42 to impart rotational movement into gear 40 and ultimately into gear 48 to thereby impart linear movement to eye-bolts 144A and 144B to tension or relax the chain or strap to which chain binder 10 is attached.

While the indicators 54A, 54B have been shown in the figures as notches formed in the edges that define the sections of the hexagonal configuration, other types of indicators are entirely possible. For example, instead of notches, the indicator could be a line that is painted, etched, carved, or otherwise formed in the outer surface of the drive head that extends around the periphery to divide the drive head into the sacrificial first portion and the second portion. Alternatively, the indicator does not need to be distinct element itself. The term indicator could also refer to the absence of an element. This would mean that the first portion of the drive head could have a marking, striation or color that the second portion of the drive head does not have. In that sense, the indicator could be the location at which the first portion transitions to the second portion due to the absence of that marking or striation on the other element. For example, the first portion could be bare-exposed metal and the second portion could be painted. Thus, the "indicator" on the drive head in this instance would be transition point between the bare/non-painted first portion and the painted second portion of the drive head coupled to drive axle 42.

Figure 11:
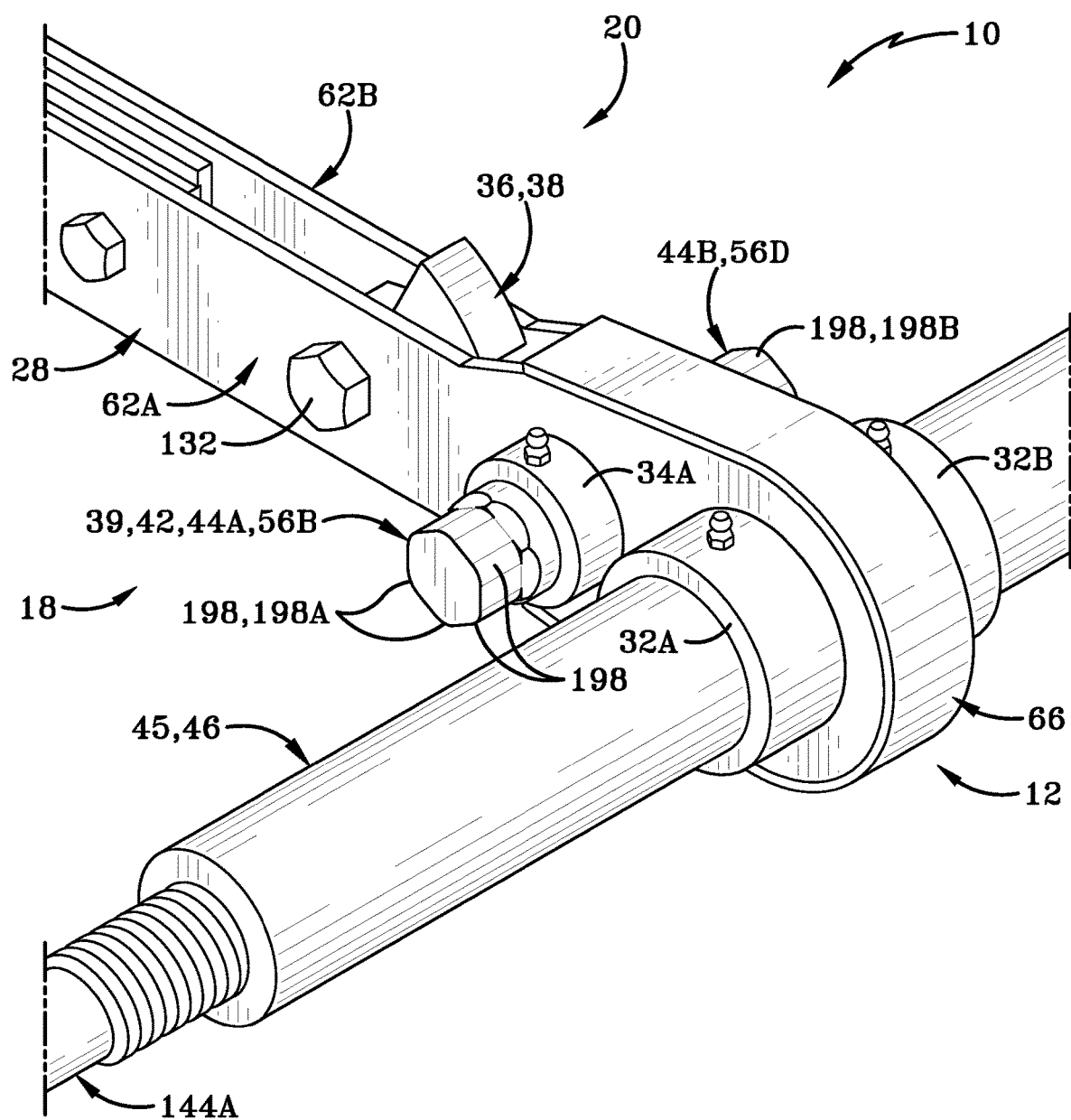
FIG. 11 is an operational top perspective view of the first drive head having been cut to reveal the second portion of the first drive head for use to drive the drive axle after the first portion of the first drive head was cut off or otherwise removed and discarded.

The operator will continue to use second portion 56B of the first drive head 44A. In the event that the second portion 56B of the first drive head 44A is stripped and gets rounded edges 198A, as shown in FIG. 11, then the operator may use the second drive head 44B and repeat the process described above but from the other side of the lever body 28. A similar process is implemented in which the first portion 56C is coupled with socket 180 and used to drive the drive axle 42 until the edges are stripped and worn to create rounded edges 198B on the first portion 56C of the second drive head 44B. Once the first portion 56C is stripped with rounded edges 198B, the second drive head 44B may be severed at the second indicator 54B so that the first portion 56C may be sacrificed, severed, and discarded leaving the second portion 56D of the second drive head 44B to be utilized.

Figure 12B:
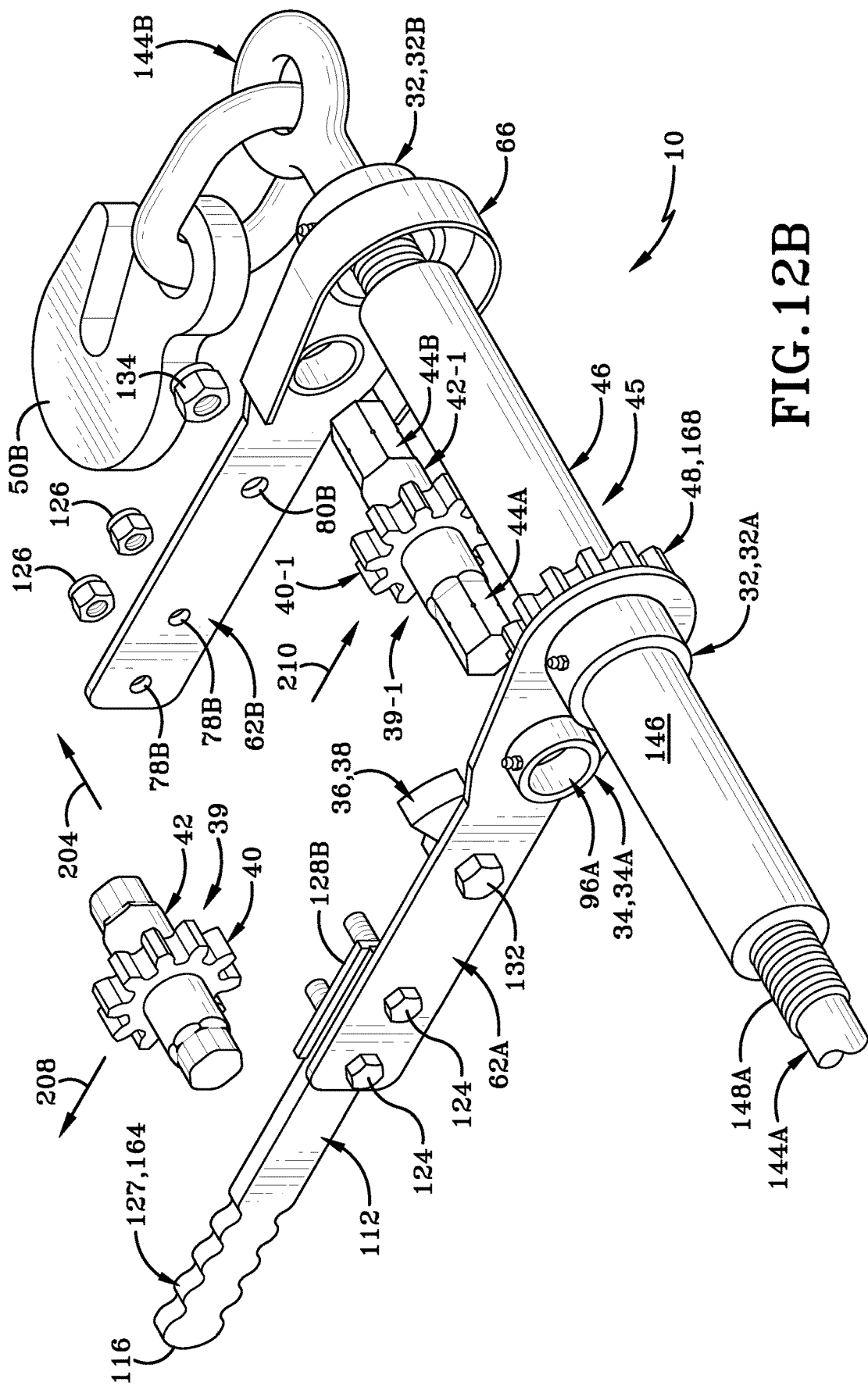
FIG. 12B is an operational top perspective view of a portion of the lever body being opened or disassembled so that a damaged drive gear can be removed and replaced with a replacement drive gear.

FIG. 12A and FIG. 12B depict the scenario after which the drive axle 42 on drive assembly 39 has been completely utilized in which the second portions have rounded edges 198A and 198B (after sacrificing or severing the respective first portions 56A and 56C of the first drive head 44A and second drive head 44B). FIG. 12A depicts that the second portion 62B of the lever body 28 may be separated from the first portion 62A. Separating second portion 62B from first portion 62A may be accomplished by removing the nuts 126 and 134. Additionally, if wall 66 is tack-welded or fully welded to the minor surface 76A on the first portion 62A, then a grinder or saw may be utilized to cut that weld to separate the second portion 62B from the first portion 62A as indicated by arrow 204. Then, once the second portion 62B is separated from the first portion 62A the drive axle 42 carrying the at least one gear 40 may be removed from its connection with the second pair of bosses 34 as indicated by arrow 206.

Thereafter, as depicted in FIG. 12B, the entire drive assembly 39 having drive axle 42 carrying the at least one gear 40 may be removed and discarded as indicated by arrow 208. Then, a new drive assembly 39-1 with drive axle 42-1 carrying a near drive gear 40-1 as a unitary component identical the original (prior to being damaged) may be inserted in the position that the former drive axle 42 and drive gear 40 previously occupied as indicated by arrow 210. Then, the first portion 62A and the 62B may be reassembled so that the new drive axle 42-1 and gear 40-1 may be utilized in the manner as previously taught having sacrificial ends thereof that may be utilized until they are stripped or otherwise worn. This process is repeatable and allows the damaged unitary component formed by drive axle 42 and gear 40 to be replaced when damaged without needing to replace the entire chain binder 10. As such, various components of chain binder 10 are modular and can be replaced when damaged without needing to replace the entirety of binder 10.

Figure 13A:
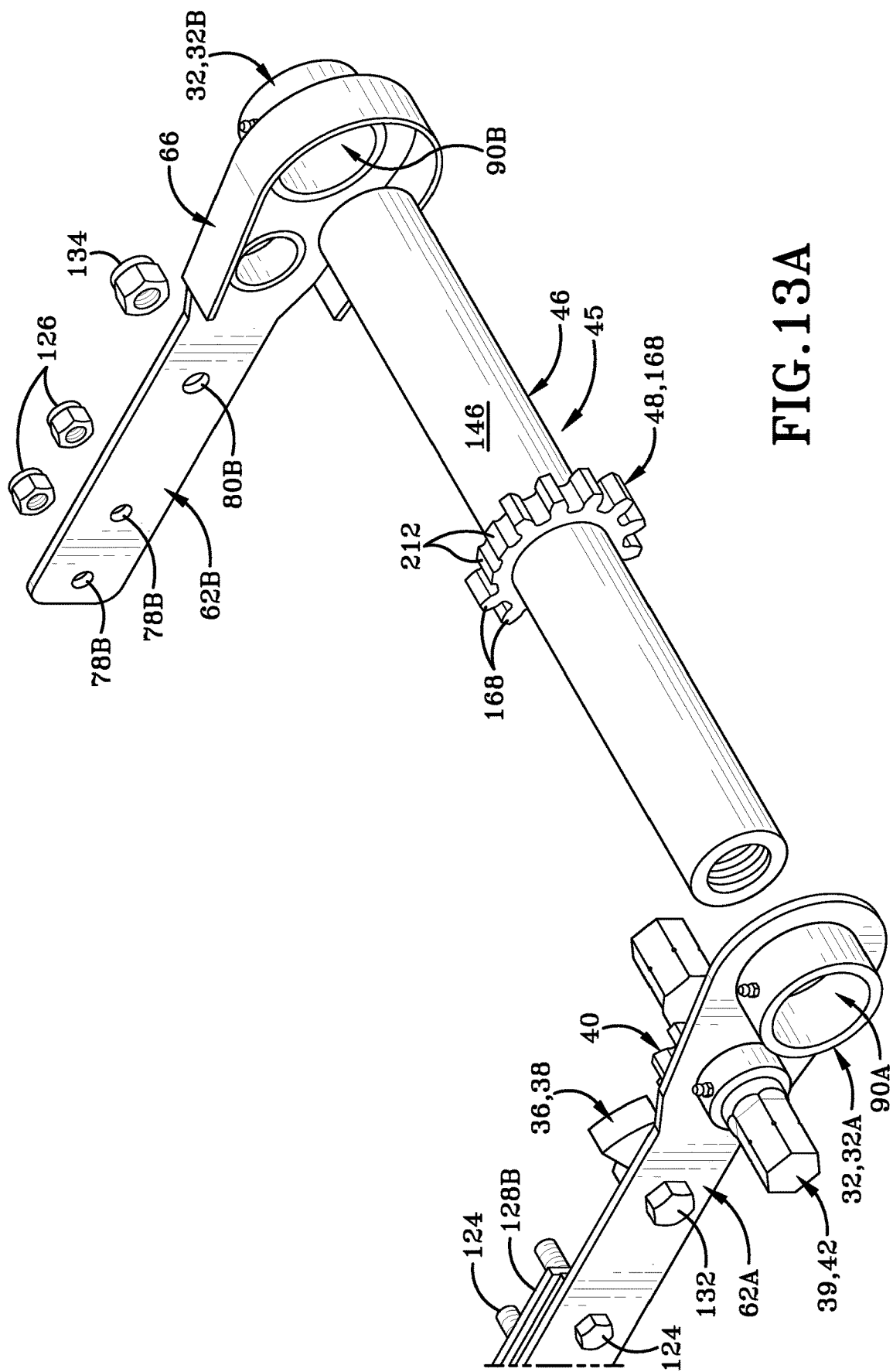
FIG. 13A is an operational top perspective view of a portion of the lever body being opened or disassembled.
Figure 13B:
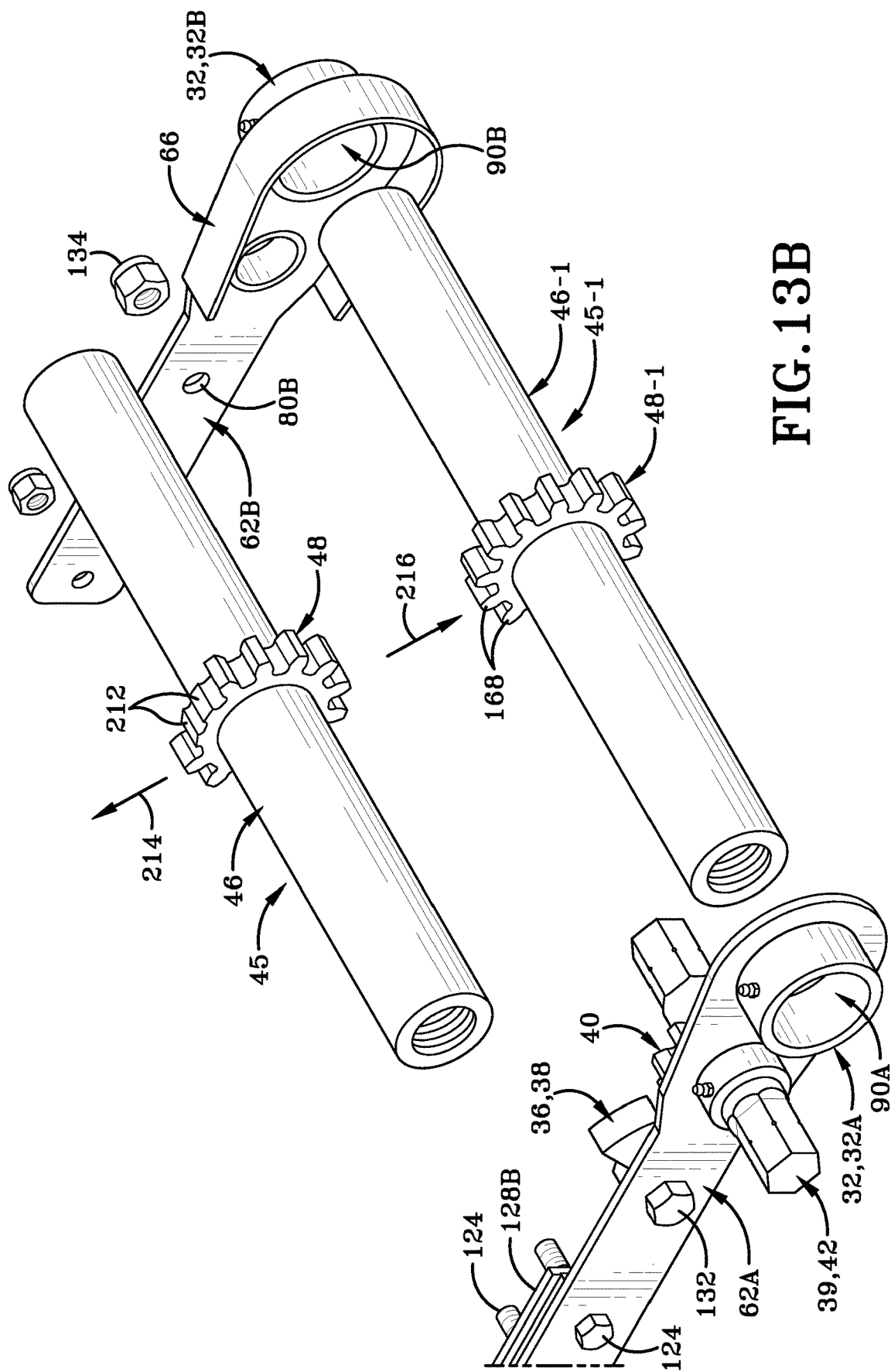
FIG. 13B is an operational top perspective view of a portion of the lever body being opened or disassembled so that a damaged tubular member and second gear can be removed and replaced with a replacement tubular member and second gear.

FIG. 13A and FIG. 13B depict a similar module-replacement process in which gear 48 can be replaced if it is damaged. For example, FIG. 13A depicts a scenario in which gear 48 has broken one or more of its cogs 168, wherein the broken cog is represented by broken cog 212. When the first portion 62A is separated from the second portion 62B (in the manner described above) the tubular assembly 45 having tubular member 46 with the broken cog 212 may be removed as indicated by arrow 214. Then, a new tubular assembly 45-1 having a tubular member 46-1 carrying a new gear 48-1 may be inserted in the space and positioned in the same manner that the broken tubular member 46 previously occupied as indicated by arrow 216. The chain binder 10, and more particularly the lever body 28, may be reassembled the continue operations previously discussed.

The advantage of chain binder 10 having replaceable components significantly reduces costs of previous chain binders. Particularly, a new chain binder costs multiple thousands of dollars. The ability to have replaceable components reduces the costs and enables an operator to simply replace a broken part rather than having to discard the entire chain binder if either the drive axle strips or breaks of one of the gears breaks. Similarly, this module-replacement process could be implemented if handle 112 is ever broken. Namely, the portions 62A, 62B would be separated and a replacement handle would be installed, and then the portions 62A, 62B would be reassembled so chain binder 10 can resume normal operations. These broken components may simply be replaced by disassembling the portions 62A, 62B of the lever body 28 and replace the broken component rather than discarding the entire chain binder 10 and purchasing a new one.

Figure 14:
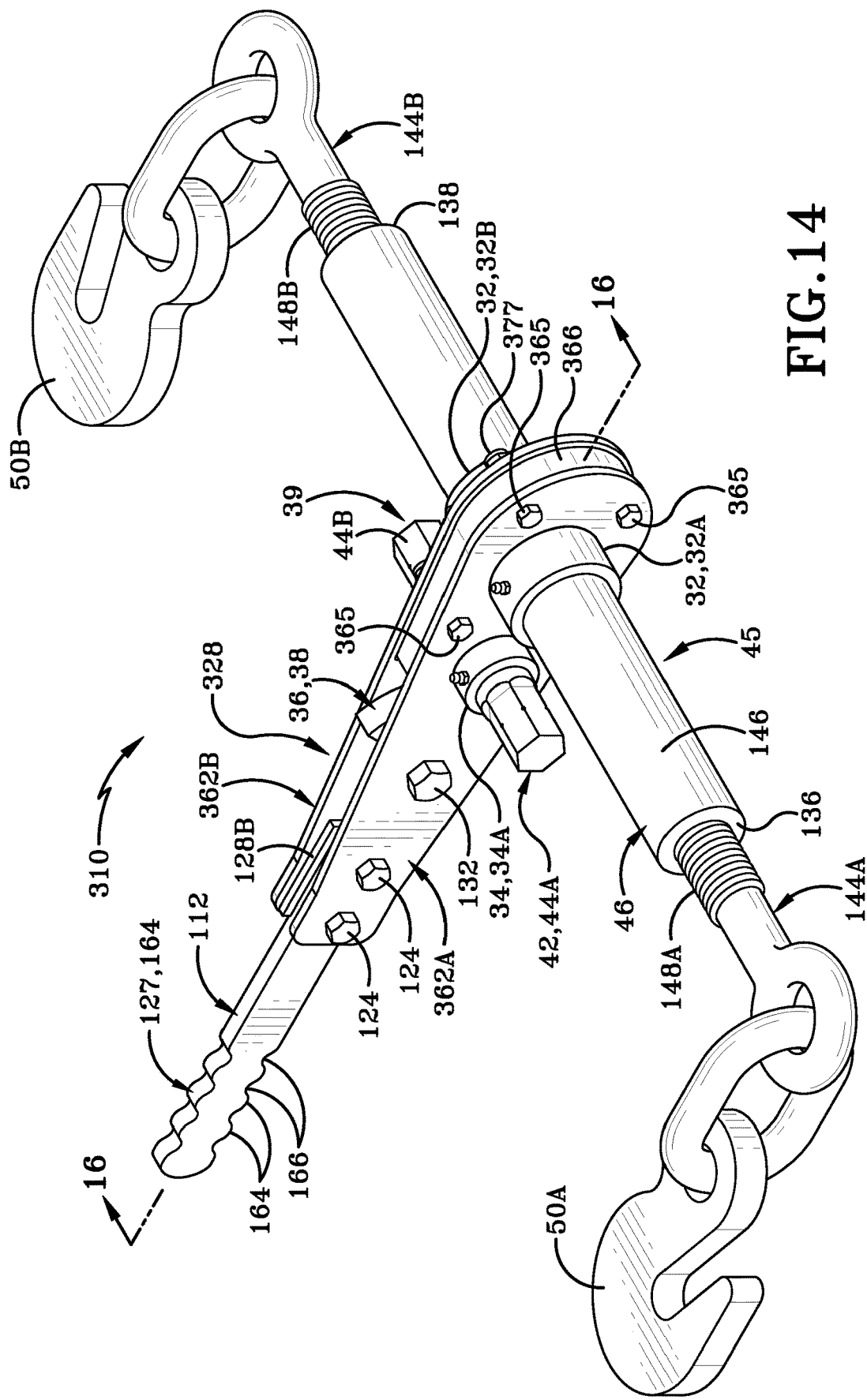
FIG. 14 is top perspective view of a second embodiment of a chain binder of the present disclosure.
Figure 15:
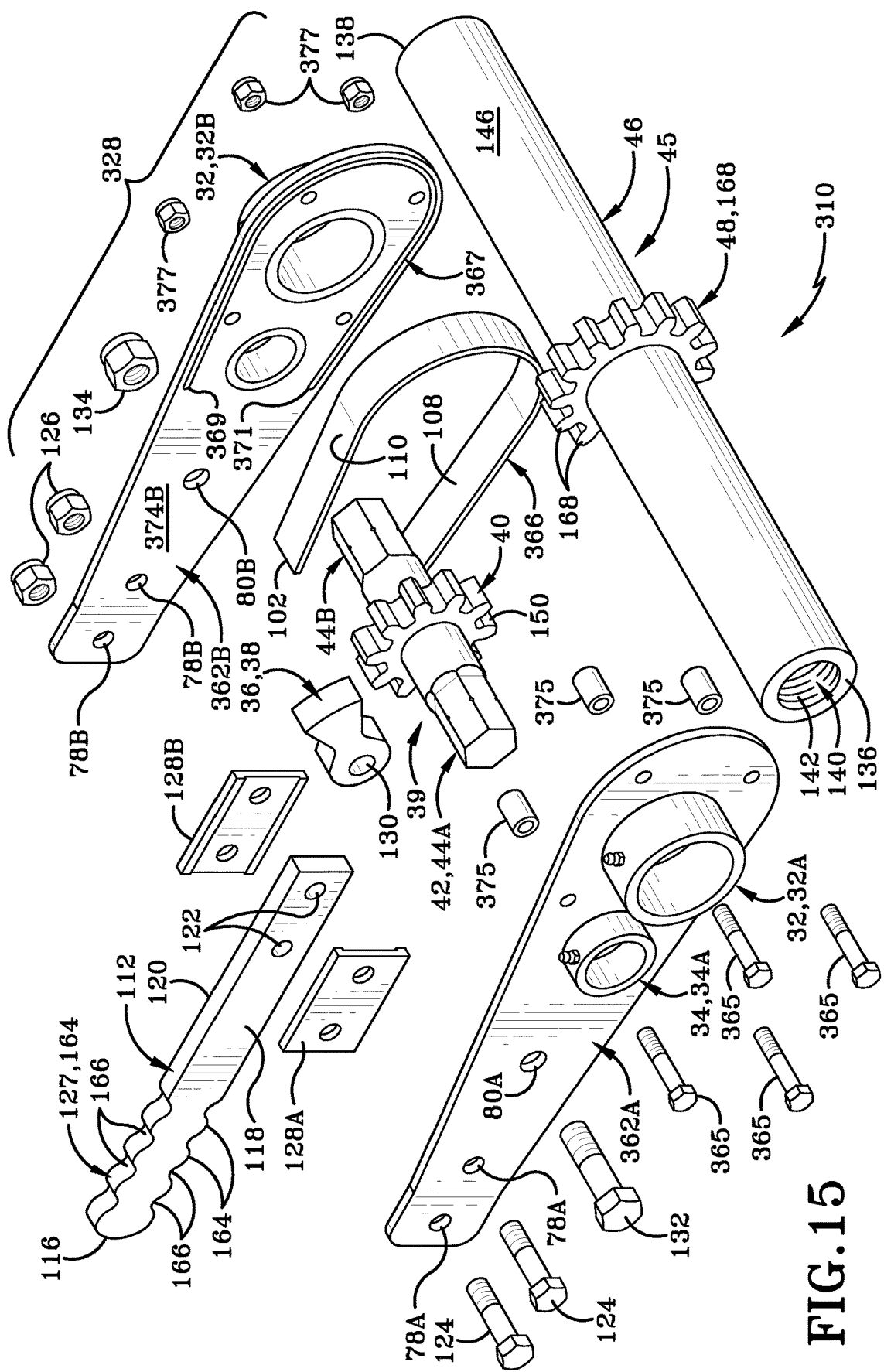
FIG. 15 is a an exploded perspective view of the lever body and tubular member of the second embodiment of the chain binder according to another exemplary embodiment of the present disclosure.
Figure 16:
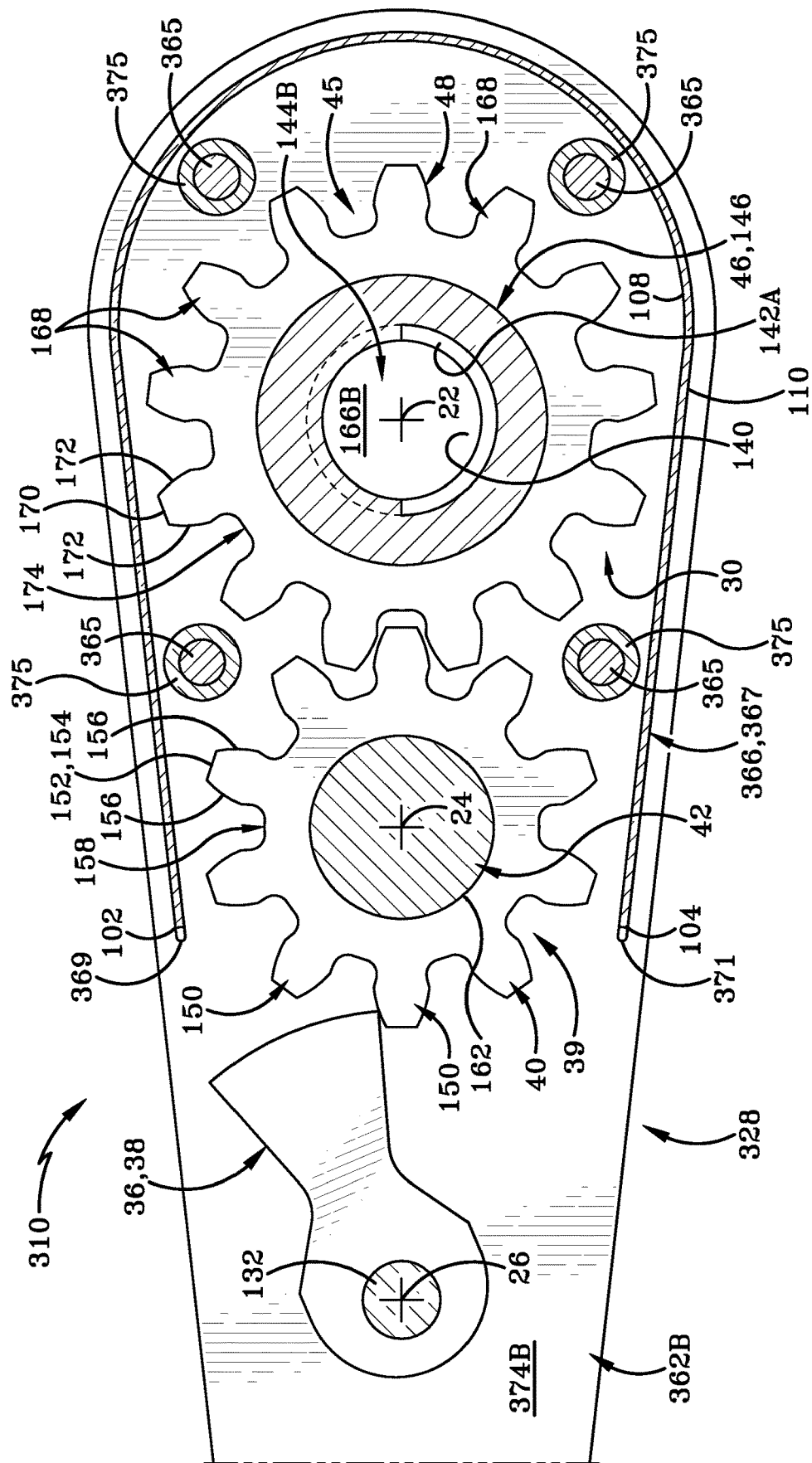
FIG. 16 is a longitudinal side cross-section view of the lever body taken along line 16-16 in FIG. 14.

FIG. 14, FIG. 15 and FIG. 16 depict a second embodiment of a chain binder generally at 310. Notably, chain binder 310 includes many of the components described with respect to chain binder 10 and thus reference elements shown with similar numerals are understood to have the same structure and operation as previously described. The differences with chain binder 310 are in its ability to be separated in order to access the drive axle 42 and the tubular member 46.

Chain binder 310 includes a first portion 362A and a second portion 362B that are connected together with bolts 365. Wall 366 is retained between the first portion 362A and the second portion 362B in a U-shaped channel 367B. The U-shaped channel 367 extends from a first end 369 to a second end 371 that is formed in the interior surface 374B of the second portion 362B. Bolts 365 extend through apertures in the first portion 362A and the second portion 362B. Spacers 375 receive bolts 365 therethrough and are disposed within the interior space 30 of the lever body 328. Bolts 365 are secured with nuts 377. The use of the bolts 365 and nuts 377 enable to lever body 328 to be easily disassembled when the drive axle 42, gear 40, tubular member 46, or gear 48 need replaced as described herein in a similar manner with respect to the previous embodiment of chain binder 10.

Spacers 375 may provide some criticality to the chain binder 310 to ensure proper side-to-side dimension are maintained between the first portion 362A and the second portion 362B. Spacers 375 may be rigid members shaped as a short rigid cylindrical tube having an outer diameter and an inner diameter. The inner diameter extends to an inner surface defining a bore that is aligned in the transverse direction. The ends of the spacers may directly contact the inner surfaces of the first portion 362A and the second portion 362B. In one embodiment, there may be four spacers that are spaced equally about the axis about which the tubular member rotates. The bolts that extend through the spacers would be spaced at the same location about the axis about which the tubular member rotates.

While the embodiments shown herein depict chain binder 10 or chain binder 310 as having both the gear 40 and gear 48 in operative communication, it is to be understood that the techniques disclosed herein can be utilized with an alternative chain binder utilizing only a single gear. For example, there may be a chain binder having a lever body comprising a ratchet mechanism having a pawl in operative communication with a gear on a tubular member, which may be akin to a turnbuckle. In this instance, the chain binder embodiment having a single gear can include a pair of boss that extend in opposite direction from respective sides of the lever body that function as races for the tubular body when it turns about a transverse axis. Similarly, this embodiment can be outfitted with the ability for the respective sides to be separated in the event the single gear or pawl needs to be replaced if damaged. As such, it is to be understood that a chain binder with a single gear may be envisioned within the scope of the appended claims unless expressly claimed otherwise.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The term "grease fitting" encompasses all types of grease fittings. For example, the grease fitting may be a standard grease fitting, a drive (push-in) grease fitting, a pressure relief grease fitting, a button head grease fitting, a Zerk grease fitting, or a thread forming grease fitting. Further, the grease fitting (regardless of type) may have any angle to effectuate the application grease to the tool. For example, some grease fittings are straight, 90°, 67.5°, 65°, 45°, or 30°, any of which may be utilized. In one embodiment, all the grease fittings on the tool are the same type of grease fitting with the same angle. However, that need not be the case. For example, it is possible that some grease fittings on the tool are one type of grease fitting and that other grease fittings on the tool are another type of grease fitting. Or, it is possible that the grease fitting are all the same type of grease fittings but some grease fittings on the tool have one angle and that other grease fittings on the tool have a different angle.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention. For example, due to naming nomenclature, it is to be understood that the second pair of bosses 34 composing the first boss 34A and second boss 34B are to be understood as the third boss and the fourth boss in the appended claims. Stated otherwise, in the appended claims, when the term "third boss" is used, it refers to boss 34A and when the term "fourth boss" is used, it refers to boss 34B. The reason for this is because in the appended claims, the first boss refers to boss 32A and the second boss 32B.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A chain binder comprising:
   a first end opposite a second end defining a longitudinal direction therebetween, and a first side opposite a second side defining a transverse direction therebetween, wherein the longitudinal direction is perpendicular to the transverse direction;
   a drive axle assembly including a drive axle coupled to at least one gear;
   a first drive head on the drive axle that is adapted to driven by a device, and the first drive head having a first portion and a second portion;
   an end of the first drive head on the first portion, wherein the first portion is adapted to be sacrificially used to drive the at least one gear and if the first portion becomes damaged, then the first portion is sacrificed and severed to leave the second portion connected to the at least one gear and then the second portion is adapted to be used by the device to drive the at least one gear after the first portion was sacrificed, severed and discarded;
   a tubular member extending along an axis, and the tubular member having a second gear fixedly attached to the tubular member, wherein the second gear is in rotational communication with the at least one gear, wherein a portion of the tubular member extends in the transverse direction; and
   a first connector adjacent the first side and a second connector adjacent the second side, wherein movement of the at least one gear is configured to move the first and second connectors relative to each other to tension or relax an element to which the chain binder is attached.

2. The chain binder of claim 1, further comprising:
   a first indicator on the first drive head located between the end and the at least one gear, wherein the first indicator divides the first drive head into the first portion and the second portion and provides an indication as to where to sever the first portion from the second portion;
   wherein the first portion is sacrificially used to drive the at least one gear and if the first portion becomes damaged, then the first portion may be sacrificed and severed at the first indicator to leave the second portion connected to the at least one gear and the second portion is then used by the device to drive the at least one gear after the first portion was sacrificed, severed and discarded.

3. The chain binder of claim 2, wherein the first indicator is a notch in an outer surface of the first drive head.

4. The chain binder of claim 2, wherein the first indicator is located at a location that divides the first portion and the second portion equally.

5. The chain binder of claim 2, wherein the drive axle has a hexagonal configuration and the first indicator is located at an edge of the hexagonal configuration.

6. The chain binder of claim 5, wherein the first indicator is one of six indicators on the drive axle.

7. The chain binder of claim 2, wherein the drive axle further comprises:
   a second drive head, wherein the first drive head extends outward towards the first side from the at least one gear and the second drive head extends outwards towards the second side from the at least one gear, wherein the drive axle is aligned in the transverse direction.

8. The chain binder of claim 7, wherein the drive axle further comprises:
   an end of the second drive head;
   a second indicator on the second drive head located between the end of the second drive head and the at least one gear, wherein the second indicator divides the second drive head into a first portion and a second portion, wherein the end of the second drive head is on the first portion, and wherein the first portion of the second drive head is sacrificially used to drive the at least one gear and if the second portion of the second drive head becomes damaged, then the first portion of the second drive head may be sacrificed and severed at the second indicator to leave the second portion of the second drive head connected to the at least one gear and the second portion of the second drive head is then used by the device to drive the at least one gear after the first portion of the second drive head was sacrificed, severed and discarded.

9. The chain binder of claim 1, wherein the drive axle further comprises:
   a second drive head having a first portion and second portion, wherein the first drive head extends transversely outward towards the first side from the at least one gear and the second drive head extends transversely outwards towards the second side from the at least one gear, wherein the drive axle is aligned in the transverse direction.

10. The chain binder of claim 9, wherein the drive axle further comprises:
    an end of the second drive head on the first portion thereof, wherein the first portion of the second drive head is adapted to be sacrificially used to drive the at least one gear and if the first portion of the second drive head becomes damaged, then the first portion thereof is sacrificed and severed to leave the second portion connected to the at least one gear and then the second portion of the second drive head is adapted to be used by the device to drive the at least one gear after the first portion was sacrificed, severed and discarded.

11. The chain binder of claim 10, further comprising:
    a second indicator on the second drive head located between the end of the second drive head and the at least one gear, wherein the second indicator divides the second drive head into the first portion and the second portion and provides an indication as to where to sever the first portion from the second portion on the second drive head.

12. The chain binder of claim 1, further comprising:
a lever body having a length that extends in the longitudinal direction, wherein the lever body defines an interior space, and the lever body rotates about the axis that is aligned in the transverse direction;
a ratchet mechanism comprising a pawl coupled to the at least one gear adjacent or within the interior space of the lever body; and
wherein the at least one gear is configured to move in two different modes of operation, wherein a first mode of operation moves the at least one gear by the drive axle being driven by the device and a second mode of operation moves the at least one gear in response to the ratchet mechanism moving in response to movement of the lever body.

13. A method for a chain binder comprising:
(i) coupling a device to a first portion of a first drive head extending from a first side of a chain binder, wherein the first drive head is part of a drive axle and the drive axle is coupled to at least one gear;
(ii) rotating the first drive head with the device to rotate the at least one gear;
(iii) rotating a second gear in operative communication with the at least one gear in response to rotation of the at least one gear, wherein the second gear is connected to a tubular member;
(iv) rotating the tubular member about an axis in response to rotation of the second gear;
(v) translating a first connector coupled to the tubular member relative to a second connector coupled to the tubular member in response to rotation of the tubular member, wherein translation of the first connector in a first direction places tension in an element to which the chain binder is coupled and translation of the first connector in an opposite second direction relaxes the element to which the chain binder is coupled;
(vi) determining whether the first portion of the first drive head has been damaged;
if determined that the first portion of the first drive head has not been damaged, then repeating steps (i)-(vi); and
if determined that the first portion of the first drive head has been damaged, then severing the first portion of the first drive head and revealing a second portion of the first drive head, and repeating steps (ii)-(v) with the device coupled to the second portion of the first drive head.

14. The method of claim 13, further comprising:
if determined that the first portion of the first drive head has been damaged, then severing the first portion of the first drive head at an indicator on the first drive head, wherein the indicator delineates between the first portion and the second portion of the first drive head.

15. The method of claim 13, further comprising:
(vii) determining whether the second portion of the first drive head has been damaged;
if determined that the second portion of the first drive head has not been damaged, then repeating steps (ii)-(v) with the device coupled to the second portion of the first drive head; and
if determined that the second portion of the first drive head has been damaged, then coupling the device to a first portion of a second drive head extending from a second side of the chain binder, wherein the second drive head is part of the drive axle and repeating steps (ii)-(v) with the device coupled to the first portion of the second drive head.

16. The method of claim 15, wherein if it is determined that the second portion of the first drive head has been damaged and coupling the device to the first portion of the second drive head further comprises:
(viii) determining whether the first portion of the second drive head has been damaged;
if determined that the first portion of the second drive head has not been damaged, then repeating steps (ii)-(v) with the device coupled to the first portion of the second drive head; and
if determined that the first portion of the second drive head has been damaged, then severing the first portion of the second drive head and revealing a second portion of the second drive head, and repeating steps (ii)-(v) with the device coupled to the second portion of the second drive head.

17. The method of claim 16, further comprising:
if determined that the first portion of the second drive head has been damaged, then severing the first portion of the second drive head at a second indicator on the second drive head, wherein the second indicator delineates between the first portion and the second portion of the second drive head.

18. The method of claim 13, wherein revealing a second portion of the first drive head provides the second portion of the first drive head with an outer peripheral configuration that is same as the first portion of the first drive head prior to the first portion being damaged.

\* \* \* \* \*